Jan. 13, 1959   A. D. GUNDERSON   2,868,086
TRACER CONTROLLED POWERED FEED MILLING MACHINES
Filed Feb. 14, 1957   10 Sheets-Sheet 2
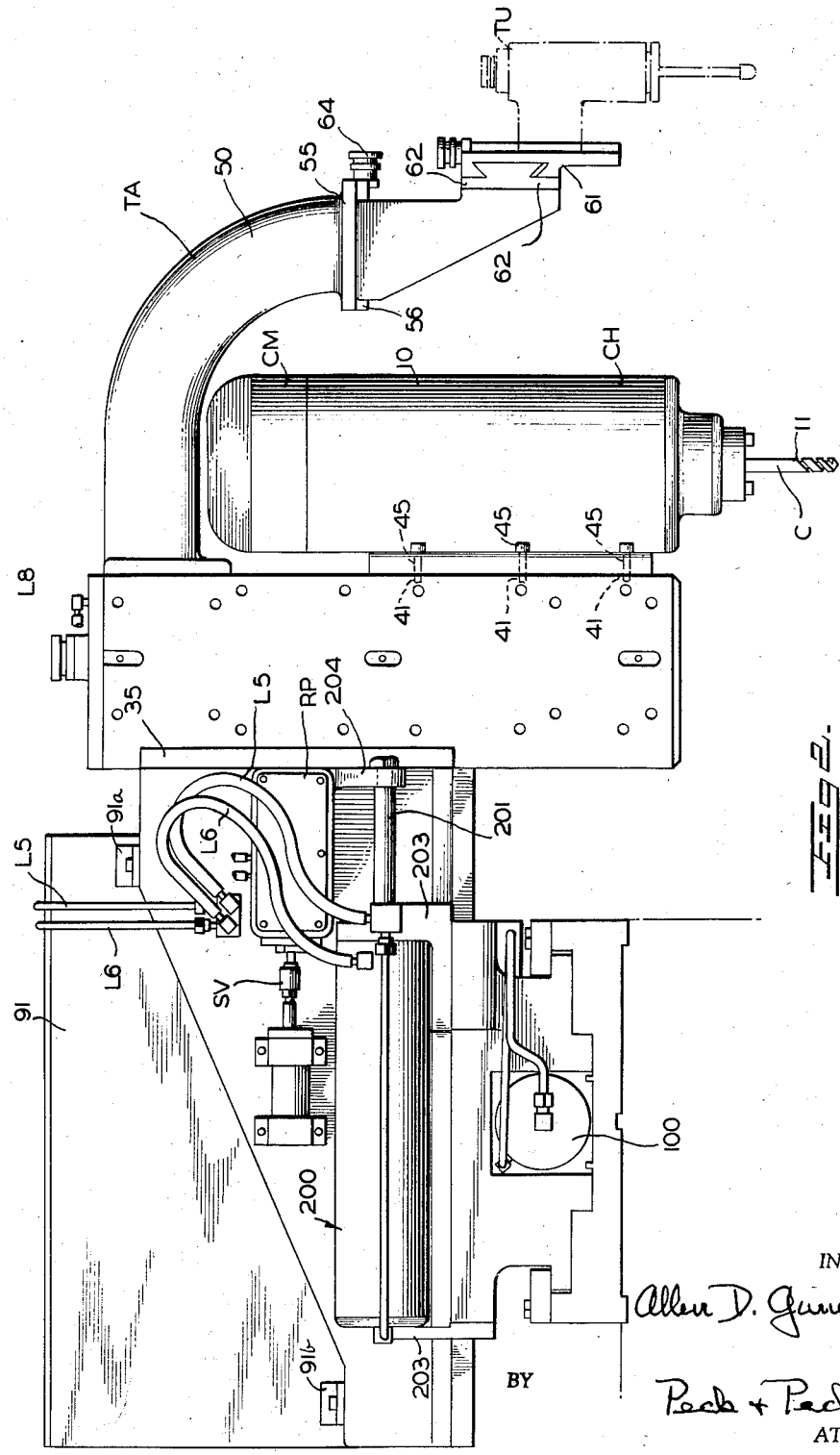
INVENTOR:
Allen D. Gunderson
BY
Peck + Peck
ATTORNEYS.

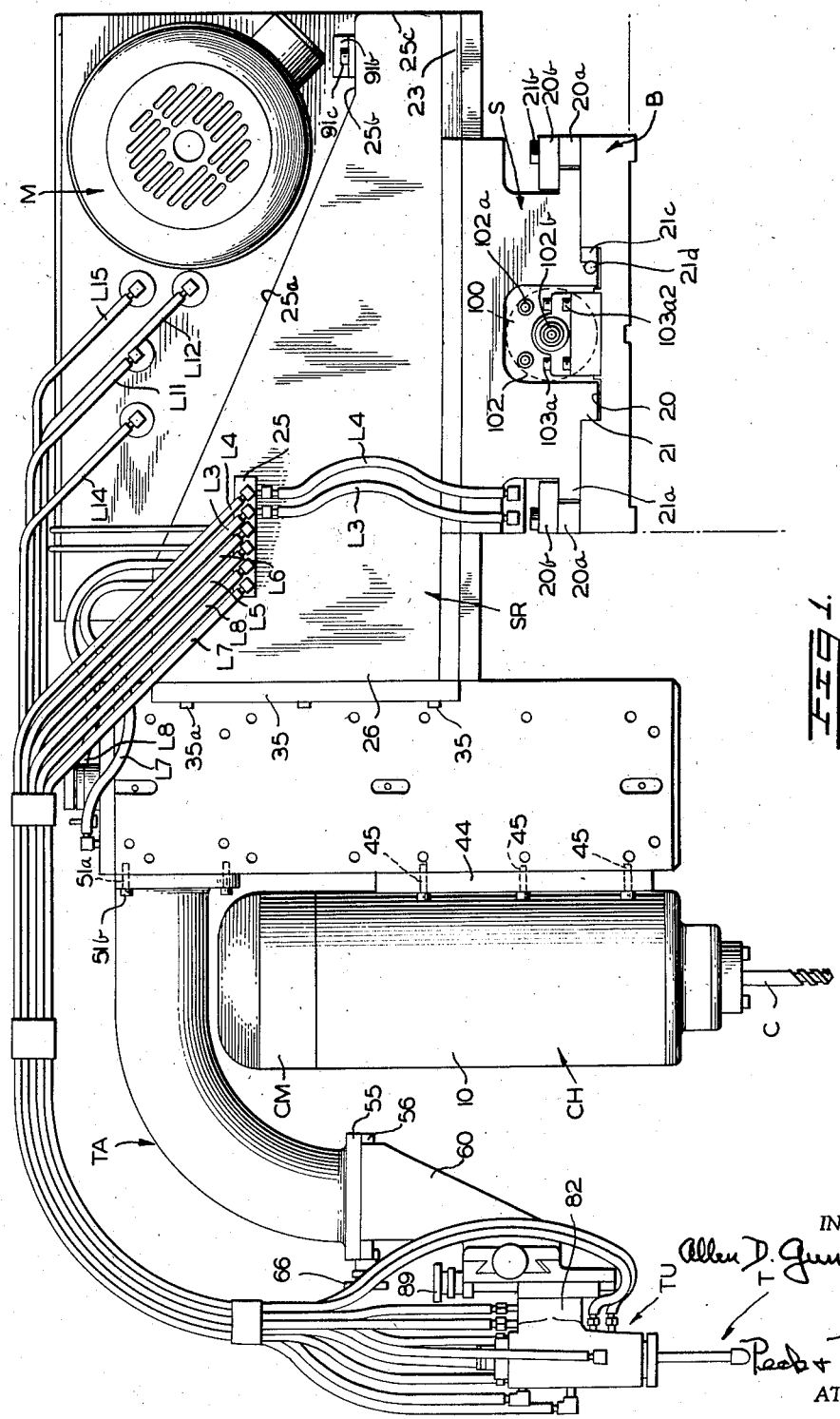

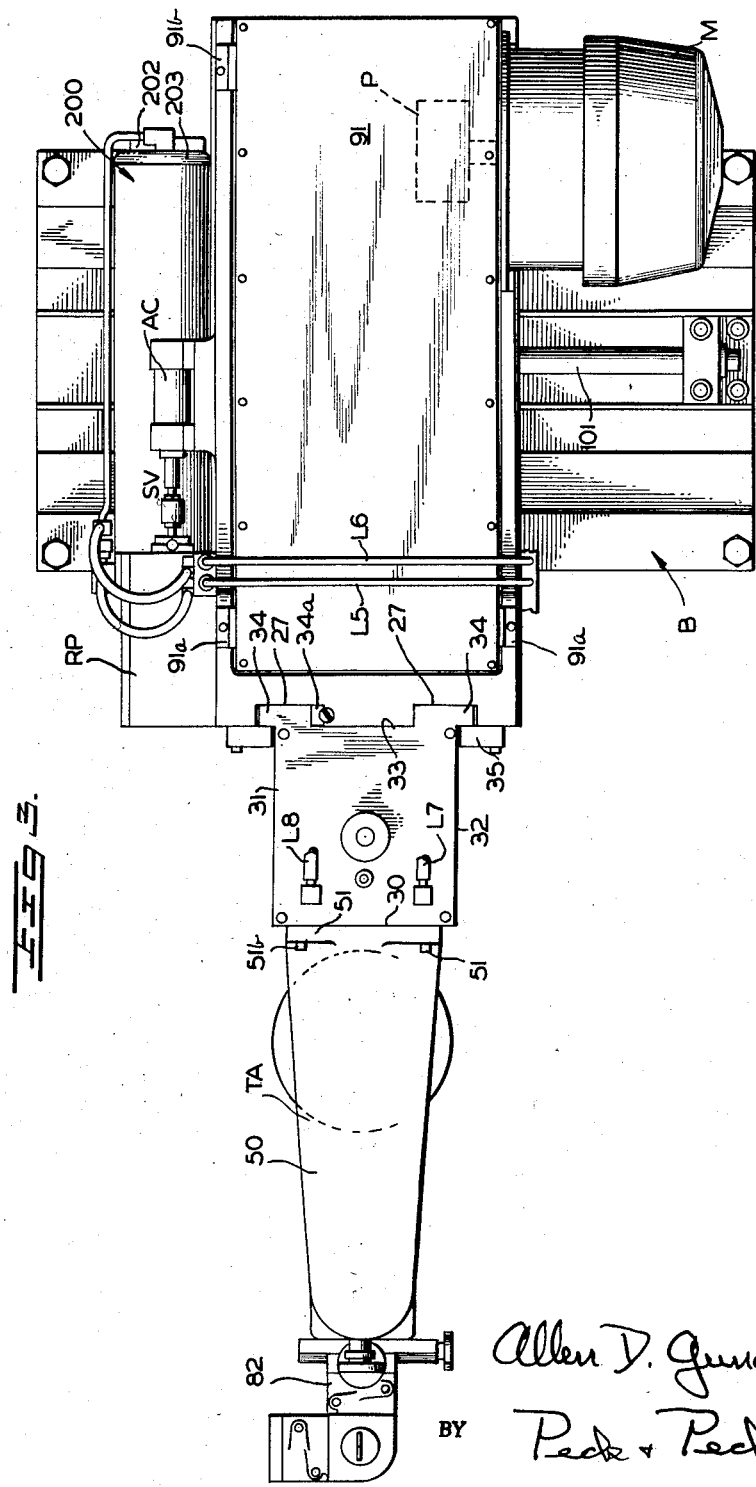

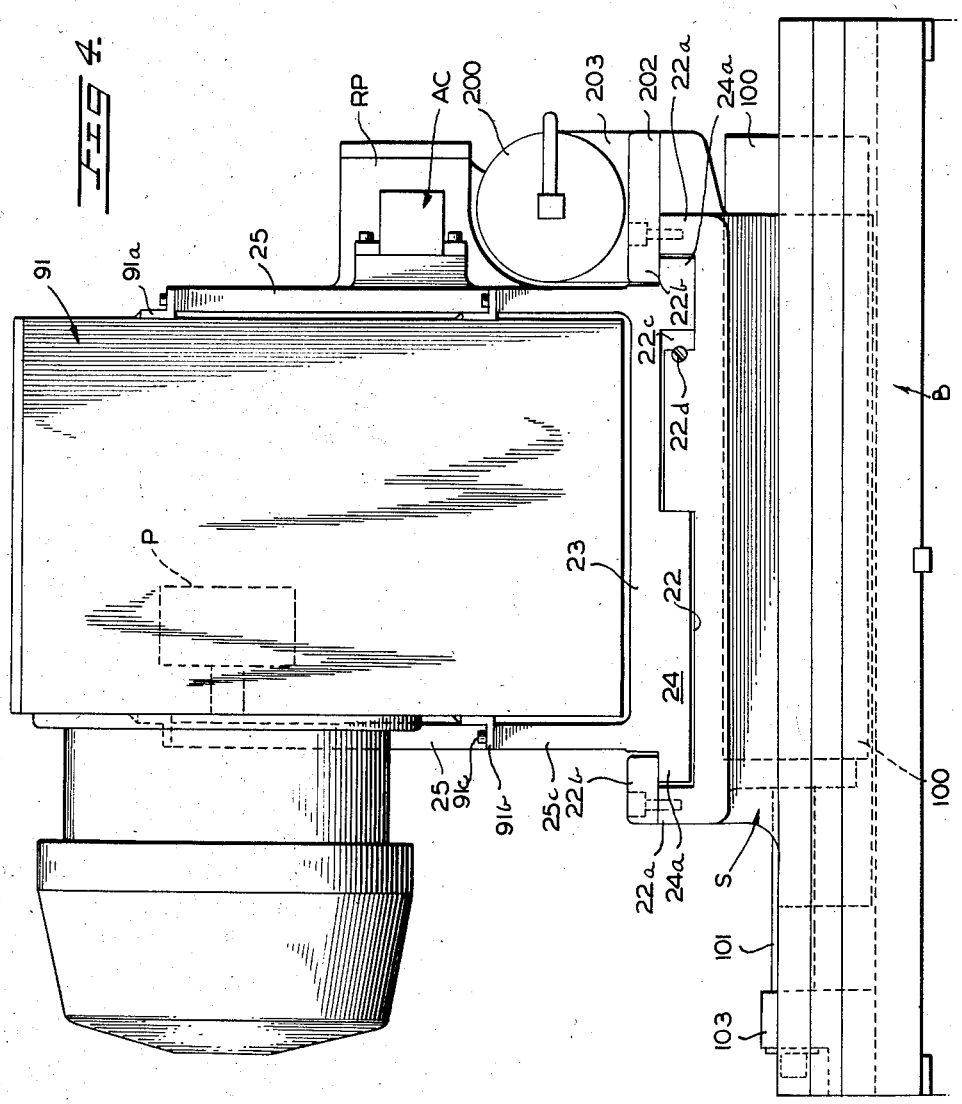

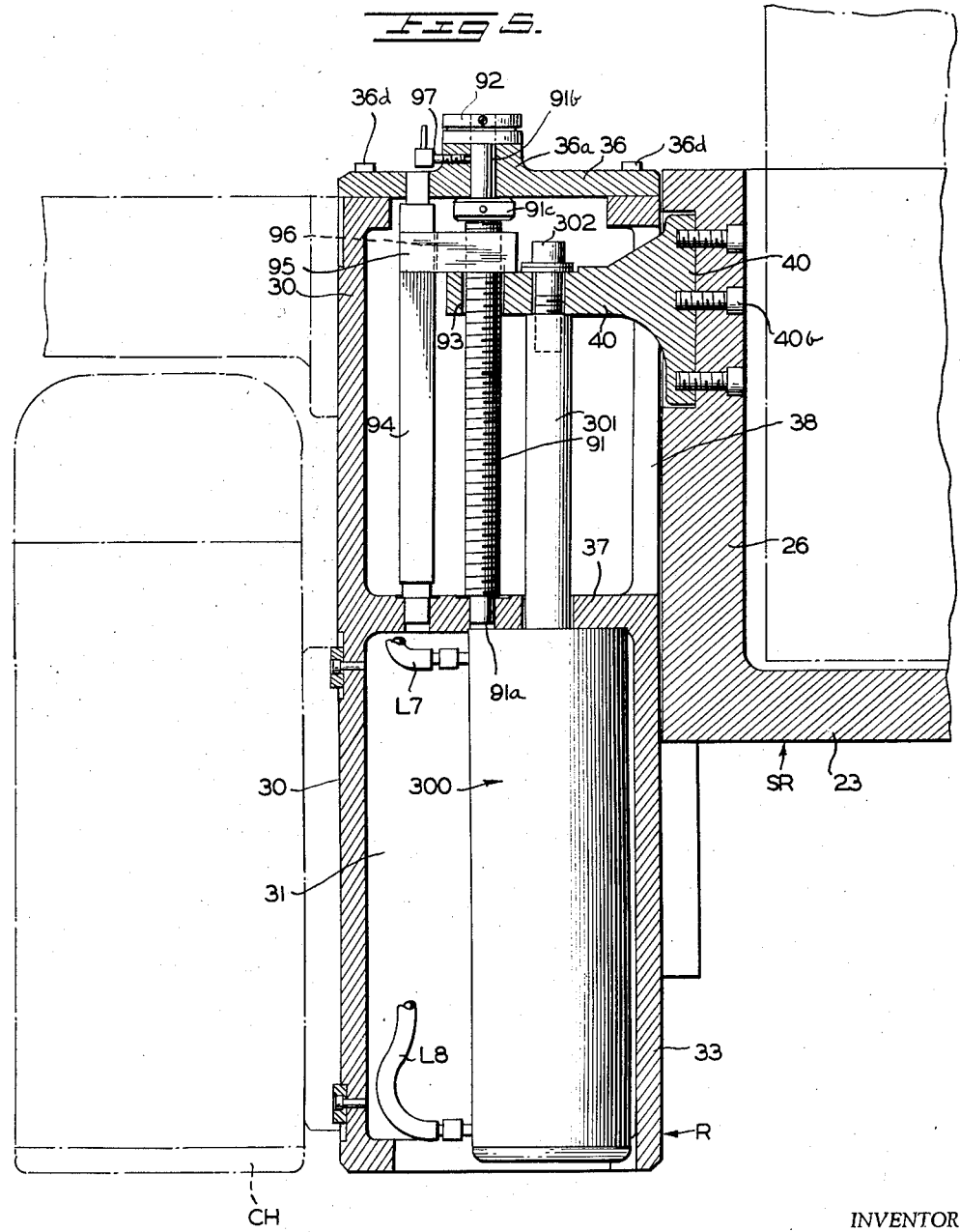

Jan. 13, 1959 A. D. GUNDERSON 2,868,086
TRACER CONTROLLED POWERED FEED MILLING MACHINES
Filed Feb. 14, 1957 10 Sheets-Sheet 6
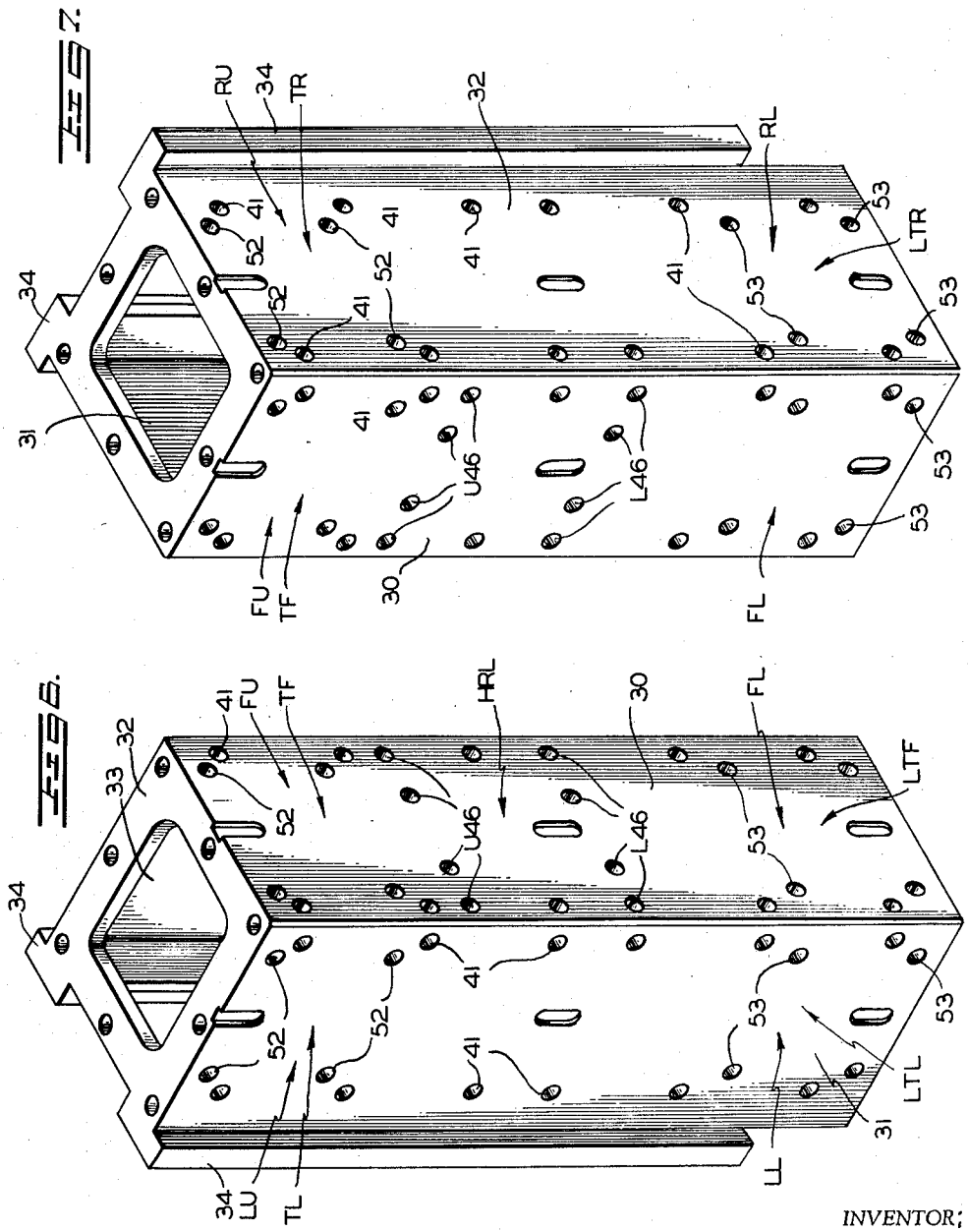
INVENTOR:
Allen D. Gunderson
BY Peck + Peck
ATTORNEYS Jan. 13, 1959  A. D. GUNDERSON  2,868,086
TRACER CONTROLLED POWERED FEED MILLING MACHINES
Filed Feb. 14, 1957  10 Sheets-Sheet 7
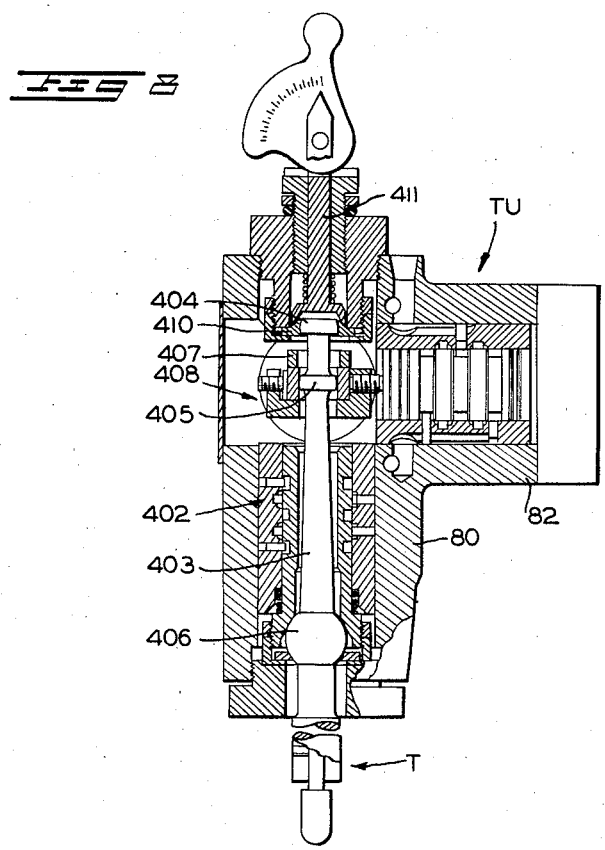
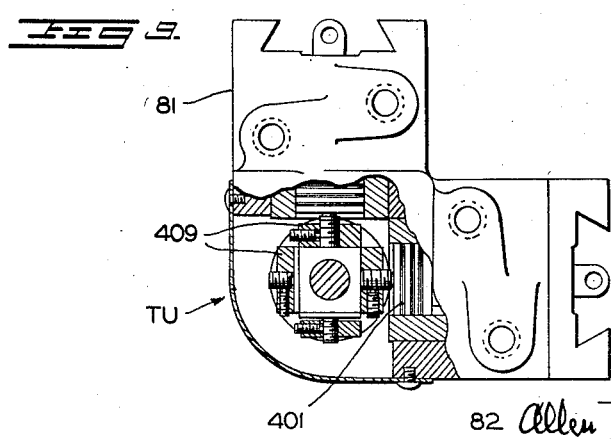
INVENTOR:
Allen D. Gunderson
BY Peck + Peck
ATTORNEYS.

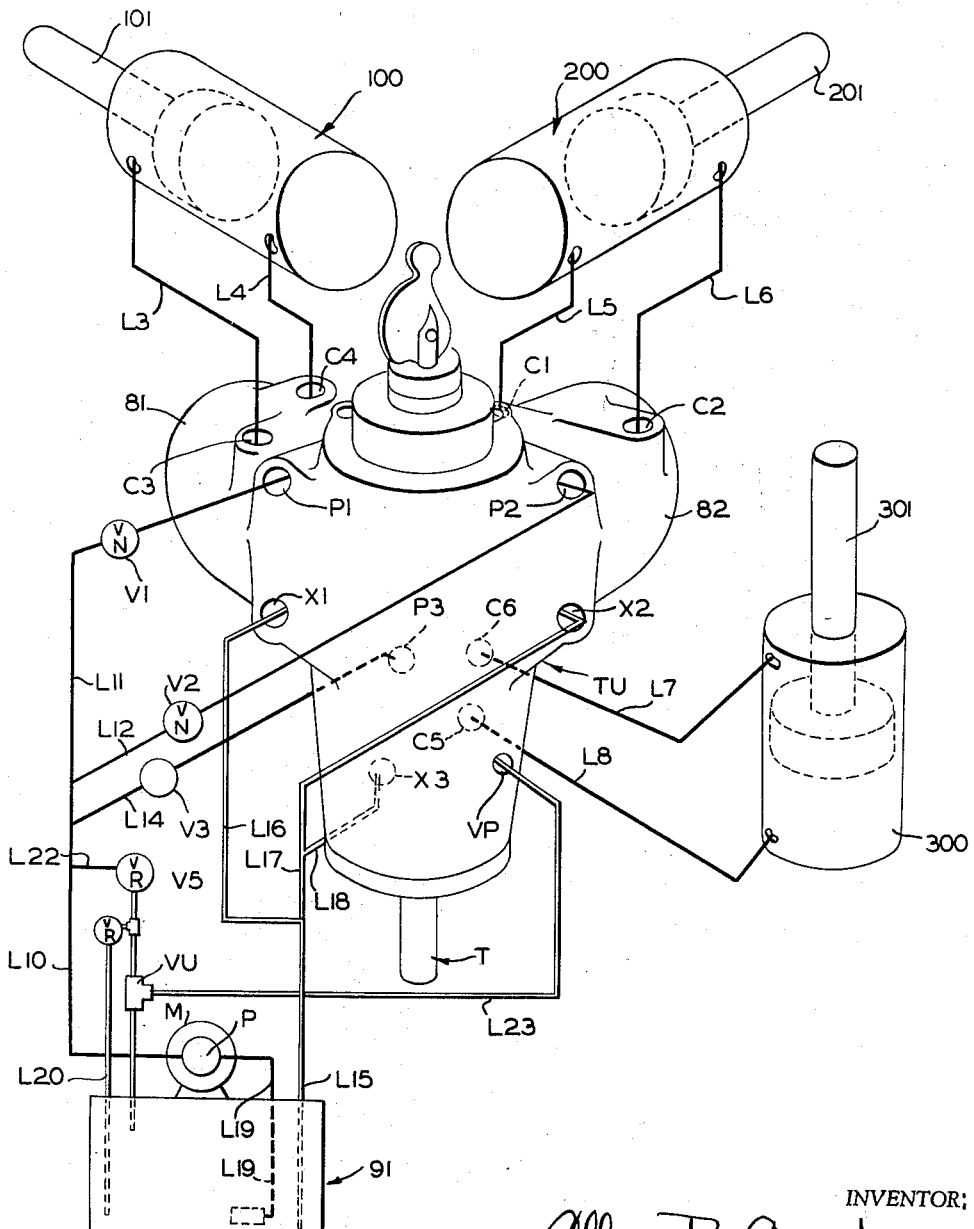

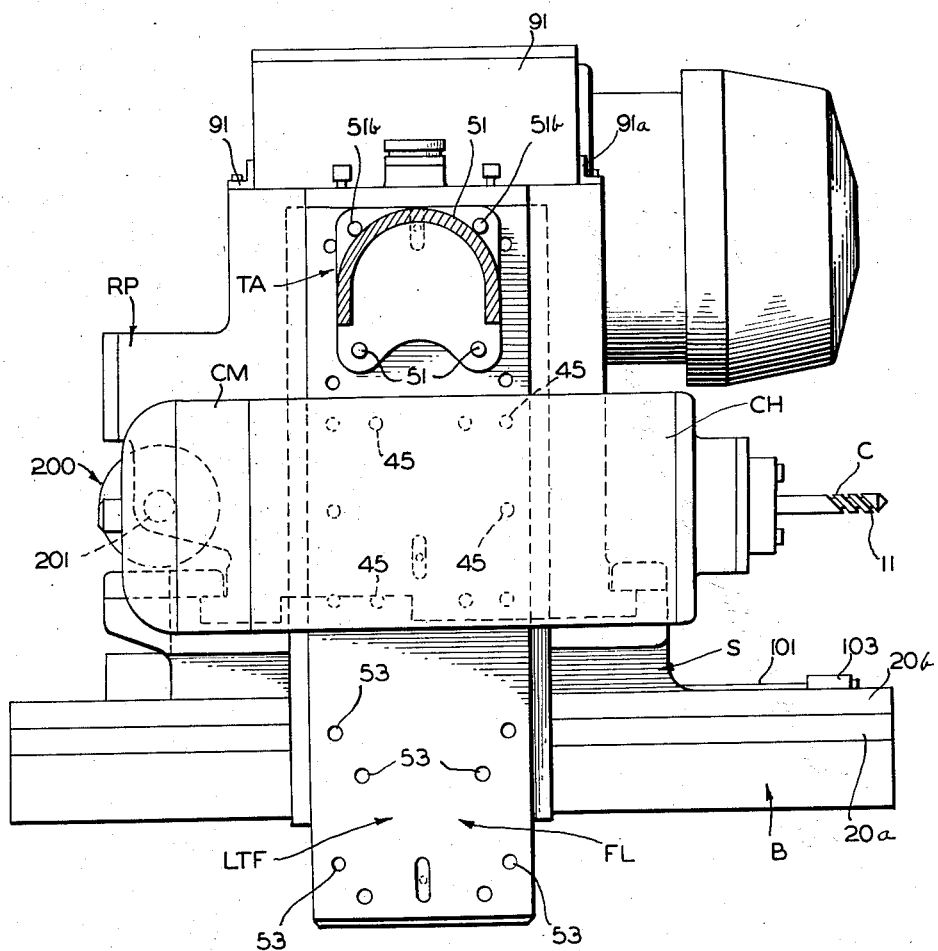

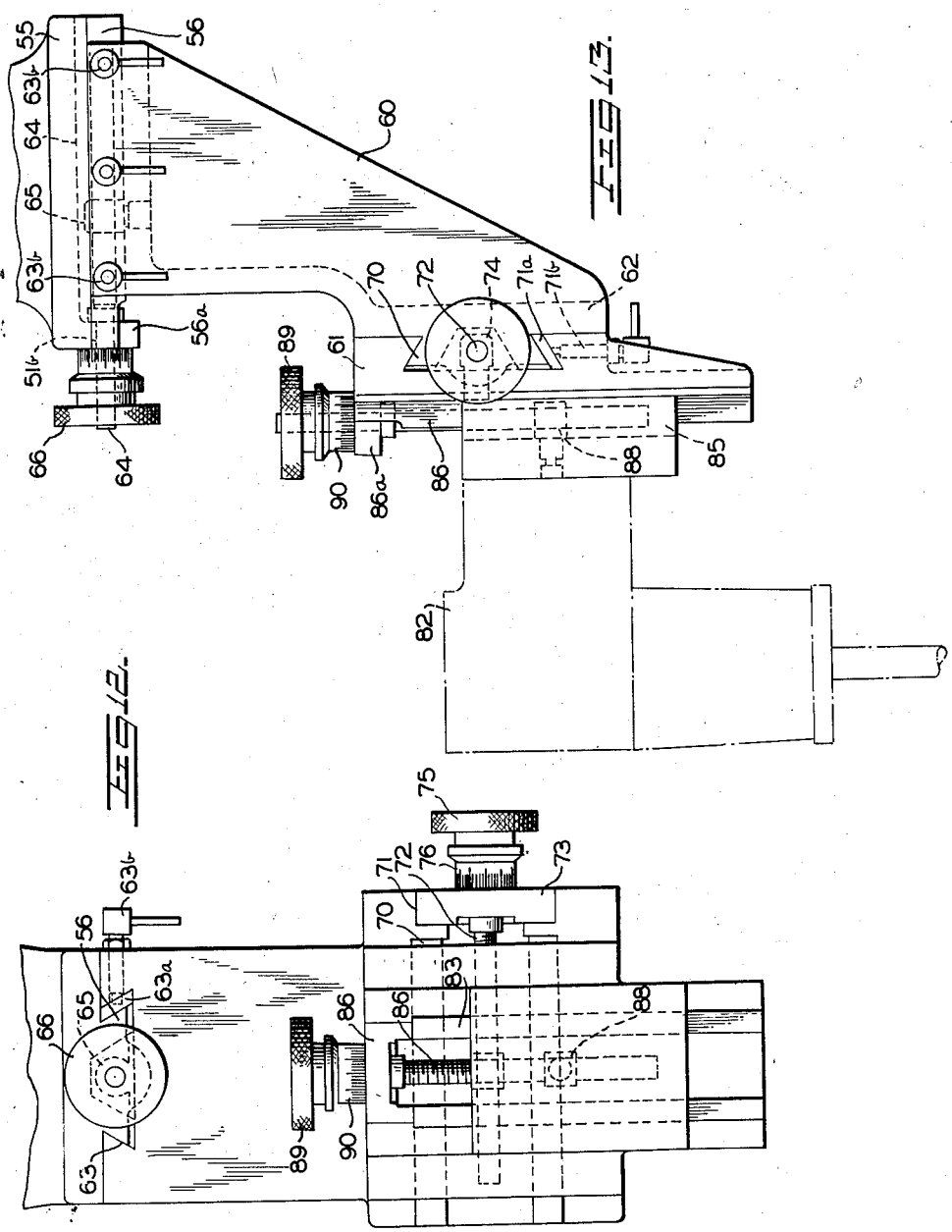

United States Patent Office 2,868,086
Patented Jan. 13, 1959

2,868,086

TRACER CONTROLLED POWERED FEED MILLING MACHINES

Allen D. Gunderson, Racine, Wis., assignor to George Gorton Machine Co., Racine, Wis., a corporation of Wisconsin Application February 14, 1957, Serial No. 640,203

12 Claims. (Cl. 90—13)

This invention relates to tracer controlled powered feed milling machines, and particularly to such machines of the three-dimensional types in which the cutter spindle of the machine is power fed relative to the work in three dimensions under the control of a tracer for effecting three-dimensional reproduction on the work; and the nature and objects of the invention will be readily recognized and understood by those skilled in the art from the following detailed description and explanation of one preferred form or mechanical expression of such a machine of the invention disclosed herein for purposes of explanation, from among various other forms, embodiments, expressions, adaptations, and combinations of which the invention is capable within the broad spirit and scope thereof as defined by the claims hereto appended.

My invention is particularly directed to providing a three-dimensional duplicating or reproducing machine, such for example as a milling machine, having a tool or cutter spindle movable in three dimensions by powered feeds under the control and dictation of a tracer for reproducing on the work in three dimensions from a pattern or master, which machine is of what may be aptly termed an "erector" type, that is, a machine which does not itself mount the work but is adapted to be positioned adjacent a separately mounted work piece or structure with the movable tool or cutter spindle of the machine in operative relation with the work for reproducing thereon from the pattern or master.

One of the primary objects of the invention is to provide such an erector type of duplicating or reproducing machine in which the tool or cutter spindle thereof is movable relative to the work in three dimensions by hydraulically powered cutter spindle feeds under the control and dictation of a hydraulic control valve type of tracing unit for manually tracing or scanning a pattern or master to effect reproducing movements of the cutter spindle in three dimensions.

Another object is to provide such a hydraulically fed and tracer controlled machine of the erector type in which the complete, tracer controlled hydraulic feed system is mounted and contained in the machine to form therewith a compact, self-contained machine assembly to thereby eliminate the necessity for separate remotely located hydraulic systems and their connecting lines for each such machine.

Another object is to provide such a machine of a compact construction and assembly having a minimum of projecting structure and parts with the basic width, length and height dimensions such that the basic machine when located in operative position will occupy a cubical space of relatively small size or volume for the maximum area of reproduction on the work of which the machine is capable.

A further object is to provide such a machine in which the cutter spindle and the tracer are positionly adjustable to give the machine operating flexibility with the ability to reach to and reproduce over wide areas of the work spaced vertically and laterally relative to the machine in any position of the machine relative to the work.

Another object is to provide such a machine in which the cutter spindle mounting head and the tracer unit may be selectively positionally adjusted relatively to the work and to the pattern or master, respectively.

A further object is to provide such a machine in which the cutter spindle mounting head and the tracer unit are mounted on and carried by a ram member movable in three dimensions with such ram member providing a plurality of differently positioned seats thereon for said cutter spindle mounting head for selective mounting of said head thereon and a plurality of differently positioned seats thereon for said tracer unit for selective mounting of the latter unit thereon.

And a further general object is to provide such a machine of relatively simple design and construction which will be of high precision in its reproducing operations from a master yet which will require but a minimum of maintenance and have a long operating life under production operating conditions.

With the foregoing and various other objects, features and results in view which will be readily apparent from the following detailed description and explanation, my invention consists in certain novel features in design and construction of parts and elements, and in combinations, arrangements and assemblies thereof, all as will be more fully referred to and specified hereinafter.

Referring to the accompanying drawings in which similar reference characters refer to corresponding parts and elements throughout the several figures thereof.

Fig. 1 is a view in side elevation of a tracer controlled powered feed milling machine of my invention, taken as from the right-hand side thereof when facing the machine and showing particularly the various flexible hose sections of the fluid lines of the self-contained hydraulic system.

Fig. 2 is a side elevation of the machine of Fig. 1 taken from the left-hand side thereof and showing particularly the relative mounting of the hydraulic actuating cylinders for the saddle and the ram support of the machine.

Fig. 3 is a view in top plan of the machine of Figs. 1 and 2.

Fig. 4 is a view in rear end elevation of the machine of Fig. 1.

Fig. 5 is a vertical sectional view through the vertical ram component of the machine of Fig. 1 showing particularly the mounting therein of the hydraulic actuating cylinder and piston unit therefor, and the micrometer adjustable depth stop mechanism for the ram component.

Fig. 6 is a detail perspective view of the vertical ram component basic structure showing the front and left-hand sides thereof with the plurality of mounting seats for the vertical ram component and the tracer unit mounting component of the machine of Fig. 1.

Fig. 7 is a view of the ram component structure similar to Fig. 6, but with the structure turned to show the front and right-hand sides thereof with the various mounting seats provided thereby.

Fig. 8 is a detail vertical sectional view through the tracer unit of the example machine of the invention, showing particularly the vertically disposed tracer spindle and associated valve spool operating and controlling mechanism.

Fig. 9 is a view partly in top plan and partly in transverse horizontal section through the tracer unit of Fig. 8 showing the vertical tracer spindle and associated horizontally disposed valve spool assemblies of the unit.

Fig. 10 is a diagrammatic view of the self-contained hydraulic system of the machine of Fig. 1 showing the pressure fluid tank and pump, tracer unit, saddle, ram support, and vertical ram actuating cylinder and piston units, together with the pressure fluid lines connecting the foregoing components in operative assembly.

Fig. 11 is a view in front elevation of the machine of Fig. 1, with the tracer arm of the machine shown in vertical transverse section, and showing particularly the motorized cutterhead of the unit in one of its horizontal positions mounted across the forward side of the vertical ram component of the machine.

Fig. 12 is an enlarged detail view in front elevation of the tracer unit mounting bracket assembly on the tracer unit mounting arm.

Fig. 13 is a view in side elevation of the bracket assembly of Fig. 12, the tracer unit being shown in dotted outline in a mounted position thereon.

A machine embodying my present invention has been selected and is disclosed herein purely by way of example for purposes of explaining the principles and the features of the invention. This selected example machine is of the three-dimensional, milling type in which the cutter spindle which mounts the tool or milling cutter is movable through three dimensions by hydraulically actuated feeds under the selective control and dictation of a tracer unit for scanning or tracing a three-dimensional master to thereby effect reproducing movements of the cutter spindle to duplicate the master on the work in 1:1 ratio in three dimensions. The example machine is of the so-called erector type characterized generally by the fact that the machine itself does not mount or support therein the work but is positioned adjacent the work which is usually supported separately from the machine in operative relation therewith for milling on the work a reproduction of a master scanned by the tracer unit of the machine. Such erector types of machines are particularly adapted for reproduction on large pieces of work or work structures so that the machine is, in effect, taken to the work and may be moved to various operative positions relative to the work for performing reproducing operations at various locations on the latter.

In accordance with the invention, as expressed in the example machine hereof, a cutterhead, which includes a motorized cutter spindle, is mounted on the machine for vertical feeding in either direction along a straight-line path to reproduce in one dimension and is bodily universally horizontally movable in a plane normal to the path of vertical movements to reproduce in the other two directions. This cutterhead in the example machine is mounted with the spindle thereof in vertically disposed position on a vertically movable ram member for feeding with that member in either direction vertically in the one direction, and is capable of selective mounting at any one of several positions on and around the ram and the path of vertical feeding of the latter. The tracer unit which controls not only the vertical feeding of the ram and cutterhead assembly, but also the feeding bodily laterally of the ram and cutterhead assembly in reproducing in the two other dimensions, is also mounted on and carried by the cutterhead mounting ram, and this tracer unit is adapted for selective mounting in any one of a number of positions on and around the ram and its path of vertical feeding, as well as being capable of selective positioning to locations vertically relative to the ram and along its path of vertical feeding.

The ram member is mounted on a ram support member which is slidably mounted on and carried by a saddle member for cross movements on the saddle member relative to the machine, while the saddle member is slidably mounted on a base member for longitudinal movements with the ram support member and ram member relative to the machine. The ram member is vertically slidably mounted on the ram support member for vertical feeding movements independently thereof. The saddle member, ram support member and ram member are hydraulically actuated by a hydraulic pressure system which is under the control of a hydraulic valve type of tracer unit mounted on and carried by the ram member. The complete hydraulic system including oil tank, motor driven pump and oil lines between the pump and tank and the hydraulic actuating means for the saddle member, ram support member and ram member and the hydraulic valve tracer member are mounted on and contained in the machine assembly as built-in components thereof so that the machine is a completely self-contained operative assembly which may be placed in any desired position and operated merely by connecting the pump motor with a power supply cable.

*General organization*

A tracer controlled, powered feed, three-dimensional duplicating milling machine embodying the invention, such as a machine of the selected example hereof, basically includes a bed or base B on which there is mounted a saddle S for movements on and independently of base B in either direction along a straight-line path longitudinally thereof, with a cutterhead mounting ram support SR mounted on saddle S for cross movements in either direction along a straight-line path on and independently of the saddle S. One end, the forward end, of the ram support SR mounts thereon a cutterhead supporting ram R for movements in either direction along a straight-line path normal, that is at right angles, to the planes of the paths of movement of saddle S and ram R. In this instance the saddle S and ram support SR are mounted in horizontally disposed positions for feeding movements along paths perpendicular to each other with the ram R thus being mounted for vertical feeding movements in either direction along and constrained to its straight-line path. A cutterhead CH is mounted on the ram R and includes a motor CM and a cutter spindle C driven thereby, the motor M in this instance being located at one end of the casing 10 of the cutterhead CH with the cutter spindle C extending longitudinally through casing 10 to project at the end thereof opposite motor M for mounting a suitable rotary tool, such as a milling cutter 11 in the usual manner familiar in the milling art. A tracer unit support arm TA is also mounted on and carried by the ram R for movement bodily with the latter. This tracer arm TA in mounted position on ram R projects outwardly therefrom and mounts and supports at its outer end a tracer head or unit TU. The tracer unit TU includes a tracer finger or spindle T for manual scanning or tracing over the master or pattern to be reproduced on the work.

The base B is provided with a slideway 20 disposed longitudinally thereacross and the underside of the saddle S is provided with a slide 21 which is slidably received in slideway 20 and mounts the saddle S on the base B for straight-line longitudinal movements in either direction thereon relative to the machine. Spacer bars 20a are mounted on the upper side of base B along the opposite longitudinal side edges thereof on which are mounted the retainer bars 20b which extend inwardly over and are slidably engaged on outwardly extending guide flanges 21a along opposite sides of the slide 21 of saddle S. Suitable machine screws 21b may be used to secure the spacer bars 20a and retainer bars 20b in position on base B by threading the lower ends of such machine screws into suitable tapped bars provided in the base B. A gib 21c and adjusting screw 21d therefor are mounted in the slideway 20 at one side of the slide 21 in the usual manner and for the usual purpose familiar in the art.

The upper side of the saddle S is provided with a slideway 22 thereacross disposed transversely, that is, crosswise and at right angles to the slideway 20 of the base B, in which the slide 21 of the saddle S is slidably received and mounted. The ram support SR is in this example a generally rectangular structure which includes a bottom or base wall 23 provided with a slide 24 thereacross which is slidably received and mounted in the cross-slideway 22 on the upper side of saddle S. The saddle S is provided with upturned side edge flanges 22a which define the outer side walls of the slideway 22, and retainer bars 22b are provided along the upper edges of the flanges 22a and project inwardly therefrom over guide flanges 24a along the opposite sides of the slide 24 formed on and by the base wall 23 of the ram structure SR. A usual gib 22c is mounted in slideway 22 in operative engagement with slide 24. An adjusting screw 22d is provided for adjusting gib 22c relative to slide 24. Thus the ram support structure SR is slidably mounted on the upper side of saddle S for straightline movements thereon independently thereof along a straight-line path crosswise relative to the machine at right angles or perpendicular to the straight-line path of longitudinal movements of saddle S on the base B, and the ram support structure SR is bodily movable longitudinally along the base B with the saddle S on its straight-line longitudinal movements in any position of cross movement of the ram support structure SR on saddle S. Similarly, the ram support structure SR by simultaneous combined or compound movements longitudinally and crosswise of said structure SR on saddle S and saddle S on base B may be moved in any direction, that is, is universally laterally in the horizontal plane of the base B.

The ram support structure SR provides one of the feature components of the example machine of the invention and it comprises the base wall 23 which forms the slide 24 together with the spaced side walls 25 disposed longitudinally therealong, that is, crosswise relative to base B. A vertical front or ram mounting wall 26 extends upwardly from base wall 23 across and is joined at opposite edges thereof with the side walls 25, respectively. In this particular example it is to be noted that the side walls 25 progressively decrease in height or depth from a location just inwardly from the rear surface of front wall 26, to a location spaced inwardly a distance from the rear end vertical edges 25c of these side walls. Each side wall 25 thus is provided with a downwardly and rearwardly inclined upper edge 25a which extends to and merges with a horizontal upper edge portion 25b which joins with the vertical rear edge 25c. The vertical front wall 26 of the ram support structure SR is of relatively greater thickness than the side walls 25 and is formed at its forward, outer or front side with vertical slideways 27 which extend for the full vertical height of the wall 26.

The ram R in the machine of this example is in the form of an elongated box-like structure of rectangular cross section comprised of a front wall 30, opposite and parallel side walls 31 and 32, and a rear wall 33. The rear wall 33 provides the spaced vertical slides 34 in the form of bar members which extend outwardly beyond the adjacent opposite side walls 31 and 32 and which are slidably received in the slideways 27. Retaining bars 35 are secured in vertically disposed position on the front or forward side of wall 26 of ram support structure SR in positions extending inwardly over and slidably engaged by the outwardly extended portions of the slides 34 with the latter slidably received and mounted and confined in the slideways 27. Suitable machine screws, such as the screws 35a are utilized to attach the retaining bars 35 in fixed positions on the wall 26. Thus mounted in vertically disposed position on the forward or front side of wall 26, the ram R is vertically movable upwardly and downwardly constrained to a straight-line path by the slides 34 in the slideways 27, being secured in such mounted positions against displacement by the retaining bars 35. A usual gib 34a with an adjusting screw 34b therefor is provided in a slideway 27 for adjustment for proper slide fit.

The ram R may be formed of a hollow, rectangular cross section, box-like casting having an open upper end closed by a cover plate 36 attached in position thereon by suitable machine screws such as the screws 36a. The lower end of the ram R may be open and uncovered, as in the example hereof. An intermediate transverse wall, web or partition 37 is provided in the ram R extending across and between the walls 30, 31, 32 and 33. The rear wall 33 of ram R is vertically slotted or formed with an elongated opening 38 centrally thereof for receiving freely therein a horizontally disposed bracket 40 having a base 40a which is rigidly attached to the front face of the front wall 26 of ram support structure SR by the machine screws 40b which are extended through wall 26 and threaded into tapped bores 40c in the base 40a of bracket 40. This bracket is located in position adjacent the upper end of wall 26 and extends forwardly horizontally therefrom through the vertical slot or opening 38 in the rear wall 33 of ram R so that the ram R may be freely vertically fed upwardly and downwardly relative to but independently of and without interference from the bracket 40. Thus the ram R is mounted on the forward end wall 26 of the ram support structure SR for vertical movements upwardly and downwardly thereon independently thereof constrained to a straight-line path by the slide 34 of the ram in the slideways 27 of the ram support structure SR.

*The selectively mounted cutter head and tracer unit*

By a feature of the invention the ram R provides a plurality of mounting seats for selectively mounting the cutterhead CH on the outer side surfaces of the front wall 30 and the opposite side walls 31 and 32. In this example machine two (2) of such seats are provided on the front wall 30, namely, an upper seat FU and a lower seat FL; two (2) of such seats are provided on the left-hand side wall 31 when facing the machine, namely an upper seat LU and a lower seat LL, and two (2) of such seats are provided on the right-hand side wall 32, namely, an upper seat RU and a lower seat RL. Each of the foregoing seats of each of the walls 30, 31 and 32 is bordered and defined by sets of three (3) tapped bores 41 vertically spaced along and adjacent the opposite side edges of the wall of the ram on which the seats are located. The cutterhead CH which is comprised of the motor CM driving the cutter spindle C housed in the casing 10, is a self-contained motorized unit assembly. The cutterhead CH includes the mounting base 42 which provides the vertically disposed, outwardly extending opposite side mounting wings or flanges 43 and 44. Each of the mounting flanges 43 and 44 is provided with three (3) bores 45 therethrough spaced apart thereon distances equal to the spacing of the tapped bores 41 of the sets of such bores which border the several mounting seats hereinbefore identified, provided by the ram walls 30, 31 and 32. In addition to the said mounting seats above identified, as provided by the front and side walls of the ram R, a mounting seat HRL is formed and provided horizontally and transversely across the front wall 30 intermediate the upper and lower ends thereof for mounting and seating the cutterhead CH thereon in horizontally disposed position thereacross with either the cutter spindle C located at the right-hand side of the ram R, or reversed and located at the left-hand side thereof. This seat HRL is bordered and defined by the horizontally spaced upper tapped bores U46 across the upper side thereof and the horizontally spaced tapped bores L46 across the lower side thereof.

The tracer head or unit mounting arm TA is, as in this example, preferably formed of a curved or arcuate shaped member 50 of channel-shape in cross section having at one end thereof the generally rectangular mounting base 51 disposed transversely thereacross and relative thereto. The tracer arm TA is mounted in fixed relation on and with the ram R in any selected one of a number of different operative positions with this arm extending outwardly from the ram with the outer, tracer unit mounting end 55 thereof either disposed downwardly relative to the mounting base 51, or upwardly relative thereto, depending upon the selected position of mounting. The ram R also provides a plurality of seats thereon and therearound for selectively mounting the tracer arm TA in different operative positions thereon. In this particular example machine the tracer arm TA has six (6) different positions of mounting on and relative to the ram and these mounting positions are provided for by three (3) mounting seats provided by the outer sides of the walls 30, 31 and 32 of the ram R. A mounting seat TF is provided on the outer side of the front wall 30 of ram R adjacent the upper end thereof and this seat in this particular example partially overlaps and forms a common surface with the mounting seat FU for the cutterhead CH. A second mounting seat TL for the tracer arm TA is provided by the outer surface of the left-hand side wall 31 of ram R adjacent the upper end thereof and this seat TL partially overlaps and forms a common surface with the cutterhead mounting seat LU on wall 31. A third tracer arm mounting seat TR is provided by the outer side of the right-hand side wall 32 of the ram R and this seat TR also partially overlaps and forms a common surface with the seat RU provided by wall 32 for the cutterhead CH. The base 51 of the tracer arm TA is provided with four (4) bores 51a therethrough located in the corners, respectively, of the base for receiving therethrough the fastening screws 51b for releasably securing the tracer arm in position on any one of the seats TF, TL and TR provided by the ram 50. The walls 30, 31 and 32 of the ram R are each provided with four (4) tapped bores 52 therein surrounding the seats TF, TL and TR, respectively, for receiving in threaded engagement therein the machine screws 51a for attaching and securing the tracer arm TA in a selected mounted position on any one of the aforesaid mounting seats.

The six (6) different mounting positions for the tracer arm TA on the ram R are as follows: On seat TF with the outer tracer unit mounting end 55 of the tracer arm in upwardly projected position on seat TF in reversed position with the outer end 55 of the tracer arm TA projected downwardly; on seat TL on the left-hand side of the ram R in position with the outer end 55 of the tracer arm TA projected upwardly; in position on seat TL with the outer end 55 of the tracer arm TA projected downwardly; in position on the right-hand side of the ram R on seat TR with the outer end 55 of the tracer arm TA projected upwardly; and in reversed position on seat TR with the outer end 55 of the tracer arm TA projected downwardly.

Attention is further directed to the fact that my invention also contemplates and includes the provision by the walls 30, 31 and 32 of the ram R of three (3) additional mounting seats for the tracer arm TA formed located on the front wall 30, the left side wall 31 and the right side wall 32 adjacent the lower ends thereof, respectively, such seats being identified as the lower front seat LTF, the lower left side seat LTL, and the lower right-hand seat LTR. Each of the aforesaid tracer arm mounting seats LTF, LTL and LTR is provided with a set of four (4) tapped bores 53 for threaded engagement by the machine screws 51b for attaching the tracer arm TA on any selected one of the said mounting seats. As explained above in connection with the selective mounting of the tracer arm TA on the upper set of mounting sets TF, TL and TR, the tracer arm may be mounted on any one of the lower seats LTF or LTL or LTR in either position with the outer end 55 of the tracer arm projected upwardly or with the said outer end thereof projected downwardly. Thus, with a ram R having both the set of upper mounting seats TF, TL and TR and the set of lower mounting seats LTF, LTL and LTR for the tracer arm TA, it follows that the tracer arm then has twelve (12) different mounting positions on and relative to the ram. As will be explained hereinafter, the location of the area or surface to be milled on a work piece and the structural character and dimensions of the work piece will determine the selective positioning of not only the tracer arm TA on one of its mounting seats but also of the cutter head CH, as well as the relative positioning between the cutter-head CH and the tracer arm TA.

*The adjustable tracer unit mounting*

The tracer unit TU in this example is of the hydraulic control valve type for controlling and dictating the movements of the saddle S, ram support SR and ram R, each of which is hydraulically actuated in accordance with a pattern or master being traced by the tracer unit TU, all as will be described and explained hereinafter in detail. The tracer head or unit TU is adjustably mounted on and supported from the outer end 55 of the tracer arm TA through a relatively adjustable bracket assembly comprising the bracket 60 adjustably mounted on the outer end 55 of tracer arm TA in outward continuation thereof, and a bracket 61 slidably adjustably mounted on the outer end 62 of the bracket 60 with the tracer head or unit TU being itself adjustably mounted and supported on and from the bracket 61.

The outer end 55 of the tracer arm TA is provided with a dovetail slide 56 thereacross on a horizontal axis in a vertical plane of the longitudinal axis of the tracer arm TA, that is, on an axis radially disposed relative to the axis of the ram 50. The forward or outer end of the slide 56 relative to the ram R, is provided with a mounting flange 56a which depends therefrom and thereacross. The mounting flange 56a has a bore 56b therethrough coaxial with slide 56 for a purpose to be herebelow described.

The bracket 60 is slidably mounted and supported on the dovetail slide 56 on head 55 of tracer arm TA under the adjustment control of a micrometer adjusting mechanism. The bracket 60 at the base end thereof that is adjustably slidably mounted on the outer end of tracer arm TA, is provided with a dovetail slideway 63 thereacross which is slidably mounted and received on the dovetail slide 56 on the outer end of tracer arm TA for adjustable movement in either direction along a straight-line path by the bracket 60 relative to tracer arm TA. A micrometer adjusting screw 64 is journaled in the bore 56b through the mounting flange 56a on the tracer arm TA and this screw 64 extends inwardly through and longitudinally of the dovetail slide 56. An adjustment screw nut 65 is mounted and fixed on bracket 60 in position in the slideway 63 of bracket 60 and this nut 65 threadedly receives therein and therethrough the micrometer adjusting screw 64. The usual gib 63a is mounted in slideway 63 at one side of the slide 56 and a plurality of gib locking pins 63b are provided for clamping the gib against slide 56 to lock the bracket 60 in any position of adjustment on and relative to the tracer arm TA. The micrometer adjusting screw 64 extends outwardly a distance beyond the mounting flange 56a and has fixed on the outer end thereof a micrometer thumb wheel 66. A micrometer dial 67 is located on the micrometer adjustment screw 65 between the thumb wheel 66 and the screw mounting flange 56a. There is thus provided a micrometer adjusting mechanism by which precision, micrometer measured linear adjustments of the bracket 60 on and relative to the tracer arm TA may be made in either direction along a straight-line path radially of the vertical axis of the ram R.

The bracket 60 is provided on and across the outer side at the end thereof opposite tracer arm TA, with a dovetail slide 70 horizontally thereacross having its longitudinal axis normal or at right angles to the axis of the slide 56 of tracer arm TA and the path of movement of the bracket 60 on the latter slide. The slide 70 is formed to slidably adjustably mount thereon the bracket 61 for adjustment of the latter in either direction along a straight-line horizontal path at right angles to the straight-line path of adjustment of bracket 60 on the tracer arm TA. The bracket 61 in this example is of general plate form and includes across one side thereof the dovetail slideway 71 which slidably receives therein the slide 70 with the bracket 61 slidably mounted and supported thereon. A gib 71a is mounted in the slideway 71 for engaging slide 70 and clamping pins 71b are threaded through bracket 61 in positions spaced thereacross for clamping the gib against the slide to releasably fix the bracket 61 in any position of adjustment thereof on bracket 60. A micrometer adjustment screw 72 is mounted and journaled in a mounting boss 73 and this screw extends inwardly and longitudinally through the slide 70 in threaded engagement with an adjusting screw nut 74 which is mounted in fixed position on bracket 61. The micrometer adjustment screw 72 extends outwardly a distance from the mounting boss 73 and a micrometer thumb wheel 75 is mounted in fixed position thereon for manually rotating the screw. A micrometer dial 76 is mounted on the adjustment screw 72 in position between the mounting boss 73 and the thumb wheel 75 for precision measuring in the usual manner the degree of rotation of the adjustment screw and the resulting distance of linear adjustment of the bracket 61 on and relative to bracket 60 and the tracer arm TA.

The tracer unit TU is of the hydraulic controlling valve type for selectively controlling the hydraulic actuating means for the saddle S, ram support SR and the ram R, as will be described and explained in detail hereinafter. This tracer unit TU is mounted on the outer or forward side of the bracket 61 for adjustment vertically upwardly and downwardly thereon along a straight-line path at right angles to the horizontal straight-line path of adjustment of the bracket 61 on bracket 60 and parallel with the vertical axis or straight-line path of vertical feeding of the ram R on the ram support SR. The tracer unit TU includes a vertical housing or casing 80 having the radial extensions 81 and 82 extending horizontally from the upper half portion of casing 80 angularly spaced 90° apart therearound. The housing or casing 80 is mounted in vertically disposed position on and supported from the outer side of bracket 61 by either the radial extension 81 or the radial extension 82 thereof for a purpose hereinafter described. The tracer unit TU includes the tracer finger or spindle T which depends in vertically disposed position downwardly from the lower end of casing 80 for tracing or scanning a master by manual operation in a manner well understood in the art and hereinafter generally described. The tracer finger or spindle T is universally laterally or radially deflectable about a pivot point intermediate its ends and is also vertically axially displaceable upwardly or downwardly for the purpose of thereby selectively controlling the hydraulic valve arrangement mounted and housed within the casing 80 and the radial extensions 81 and 82 thereof.

In the specific example hereof the adjustable mounting of the tracer unit TU on the bracket 61 is carried out by providing a vertically disposed dovetail slide 83 on the outer or forward side of bracket 61 with vertical dovetail slideways 84 and 85 formed in the outer ends of the casing extensions 81 and 82, respectively. The tracer unit TU is selectively mounted on the bracket 61 by either the casing extension 81 or extension 82 with either the slideway 84 or the slideway 85 slidably receiving the slide 83 on the bracket 61. Thus the tracer unit TU can be selectively mounted in one of two positions spaced 90° apart around the axis of the housing 80. A micrometer adjustment mechanism is provided for manual operation for precise measured adjustments upwardly or downwardly of the tracer unit TU slidably mounted on the bracket 61 on the slide 83 of the latter. This micrometer adjusting mechanism comprises a micrometer adjusting screw 86 journaled in vertically disposed position through and extending downwardly from a mounting boss 86a which projects outwardly from the upper end of slide 61. This adjusting screw 86 extends downwardly across the bracket 61 and longitudinally through and along the slide 83 of the bracket 61. A micrometer adjusting screw nut 87 is mounted on the outer end of the casing extension 81 extending into the slideway 84 at a location intermediate the length of the slideway and a similar adjusting screw nut 88 is similarly mounted and positioned extending outwardly from the outer end of extension 82 into the slideway 85 of that extension. The micrometer adjusting screw 86 is threaded through the nut 87 when the tracer unit TU is mounted and supported from the bracket 61 by the extension 81 while the adjusting screw 86 is threaded through the nut 88 when the tracer unit is mounted and supported on bracket 61 by the casing extension 82. A micrometer thumb wheel 89 is mounted on the upper end of adjusting screw 86 and a micrometer dial 90 is mounted on the upper end of screw 86 between the mounting boss 86a and the thumb wheel 89. Thus the tracer unit TU in either mounted position thereof, that is, mounted by the casing extension 81 or the casing extension 82, is vertically adjustable upwardly and downwardly on and relative to the bracket 61 by manual rotation of the adjusting screw 86 with the micrometer dial 90 thereby enabling precise measurement of the linear adjustments vertically of the tracer unit TU on the bracket 61 by rotation of the adjusting screw 86.

*Hydraulic actuating means for the saddle, ram support, and ram*

In the example machine the saddle S, ram support SR, and the ram R are selectively relatively fed or displaced along their respective straight-line paths of movement under the control and the dictation of the tracer unit TU, by hydraulically actuated cylinder and piston units. The saddle S is moved or fed in either direction along its straight-line path on the base B by a hydraulic cylinder 100 actuating a piston 101, the cylinder 100 being mounted in fixed position on and carried by the saddle S while the forward end of the piston 101 of the cylinder unit is fixed to the base B. The ram support SR is moved or fed along its straight-line, cross path on the saddle S by a cylinder and piston unit which comprises the hydraulic cylinder 200 mounted on and carried by the saddle S along one side of the ram support SR and the piston 201 coupled or connected at its outer end to the ram support. The ram R is fed or moved vertically upwardly and downwardly on its straight-line path provided by the slideways 27 in the front wall 26 of the ram support SR by a hydraulic cylinder and piston unit comprised of the cylinder 300 mounted in vertically disposed position in the lower half portion of the ram R and the piston 301 connected at its upper end to the fixed bracket 40 mounted and attached on the front wall 26 of the ram support SR.

The saddle actuating or feeding cylinder 100 is mounted on the underside of the saddle S in fixed position disposed longitudinally of the saddle along the center line or axis of the slideway 20 of the base B. In this instance a mounting bracket 102 depends from the forward side of the saddle S and the forward end of the cylinder 100 is secured thereto by suitable fastening members such as the machine screws 102a with the cylinder thus secured in rigidly fixed position of precise parallelism with the plane of movement of the saddle S. The piston 101 of the cylinder 100 extends forwardly from the cylinder through a bore 102b in the bracket 102 and is connected or coupled at its forward free end to a clevis 103 which is fastened in rigid position on and to the base B at a location at the forward end of the slideway 20. The clevis 103 may, as in the example hereof, be secured to the base B by the machine screws 103a. Thus fluid under pressure admitted to the cylinder 100 at the rear side of piston 101 will longitudinally feed or displace the saddle S with ram support SR and ram R rearwardly while fluid under pressure admitted at the forward side of the piston will feed or displace the saddle S with ram support SR and ram R forwardly on the base B along its straight-line path together with the ram support SR and the ram R.

The ram support feeding or actuating cylinder and piston unit is comprised of the cylinder 200 and the piston 201. In this example the cylinder 200 is mounted in fixed position on the left-hand side of the saddle S when facing the machine, on a horizontally outwardly extended cylinder supporting structure or shelf 202 which includes at opposite ends thereof upwardly extending mounting brackets 203 to which the opposite ends of cylinder 200 are rigidly fastened. On the left-hand side of the ram support SR at the forward end thereof an ear or lug 204 is provided which extends laterally outwardly therefrom in vertically disposed position opposite the forward end of the cylinder 200, and the cylinder piston 201 is coupled or connected at its outer end to the lug 204. Thus fluid under pressure admitted into the cylinder at the right-hand side of the piston 201 will cross feed or displace the ram support SR with ram R to the right when facing the machine while fluid under pressure admitted into the cylinder at the left-hand side of piston 201 will cross feed or displace the ram support SR with the ram R to the left on and independently of saddle S.

The ram feeding and actuating cylinder and piston unit comprises the cylinder 300 and piston 301 which unit is mounted and operatively connected relative to the ram R and the ram support SR by fixing the cylinder 300 to the ram R and connecting its piston 301 to the ram support SR. In this specific machine this is carried out by mounting the cylinder 300 in vertically disposed position within the lower half of the vertically disposed ram R and adjacent the rear wall 33 of the ram with the piston 301 extending vertically upwardly from the cylinder 300 through the upper half of ram R to the forwardly extending bracket 40 to which the upper end of piston 301 is connected or coupled by the machine screw 302 which extends vertically downwardly through bracket 40 and is threaded into a tapped axial bore opening through the upper end of the piston 301. As the bracket 40 is attached in fixed position on and to the forward wall 26 of the ram support SR and as the cylinder 300 is fixed on and movable as a unit with the ram R, it follows that pressure fluid admitted to cylinder 300 at the lower side of piston 301 will feed or displace ram R downwardly while fluid under pressure admitted to the cylinder at the upper side of piston 301 will feed or displace ram R upwardly on and relative to the ram support SR on which the ram is vertically slidably mounted.

*Micrometer adjustable ram stop*

A stop mechanism with a micrometer controlled adjustment therefor is provided for the downfeed of the ram R on the ram support SR. This stop mechanism in the instant example includes an elevating screw 91 which extends vertically downwardly through the upper half of ram R between the intermediate transverse wall 37 thereof and the cover 36 over the upper end of the ram. The elevating screw 91 is rotatably journaled at its lower end in a vertical bore 91a in the transverse wall 37 and provides at its upper end an upwardly extending smooth surfaced spindle 91b which extends upwardly through and is rotatably journaled in a boss 36a on the upper side of cover 36. The outer end of spindle 36a has mounted thereon for manual rotation of the spindle and screw 91 a micrometer dial 92. This elevating screw extends freely through a smooth surfaced bore 93 with which it has operating clearance, formed through the outer end of the bracket 40 at a location to the outer side of piston 301 of the cylinder 300. A guide rod 94 of square or irregular cross section is mounted in vertically disposed position parallel with elevating screw 91 between the transverse wall 37 and the ram cover 36 with its opposite ends received and seated in socket forming bores in the transverse wall and the ram cover. This guide rod 94 is positioned parallel with the elevating screw 91 between that screw and the front wall 30 of the ram R. A stop member 95 is threaded onto the elevating screw 91 between the bracket 40 and the ram cover 36, a suitable collar 91c being secured on the spindle 91b of screw 91 between the stop member 95 and the underside of the ram cover. The stop member 95 extends radially outwardly from the elevating screw 91 to the guide rod 95 and is provided with a rectangular slot 96 therethrough which opens through the outer end thereof and slidably but non-rotatably receives therein the guide rod. Thus the stop 95 which is restrained against rotation by the guide rod 94 in the slot 96 of the stop, is raised or lowered on and relative to the elevating screw 91 by rotation of that screw and may thus be adjusted into a selected position for engagement with bracket 40 to limit the down feed of the ram R on the ram support SR. A suitable locking means in the form of a screw pin 97 threaded radially through boss 36a is provided for locking engagement with the spindle 91b of elevating screw 91 for the purpose of locking the elevating screw 91 in any position of vertical adjustment of the stop 95 on the elevating screw.

*The tracer unit*

In the expression of the invention by the example machine, the tracer unit TU is of the hydraulic control valve type for selectively controlling the operation of the saddle, ram support and ram feeding or actuating cylinders 100, 200 and 300. As this hydraulic valve type of tracer unit TU is known and familiar in the art, it is not deemed necessary herein to make a detailed disclosure thereof beyond that shown in the accompanying drawings, together with the following general description and explanation.

The tracer unit TU includes two (2) horizontal valve spools and sleeve assemblies 400 and 401 mounted in the casing extensions 81 and 82, respectively, with the axes of these valve spool assemblies located at 90° to each other. In addition to the horizontal valve spool assemblies 400 and 401 the unit includes the vertical valve spool and sleeve assembly 402 mounted in vertically disposed position within casing 80 coaxial therewith and with its axis at 90° or normal to the axes of the valve spool assemblies 400 and 401. The movements of the valve spool assemblies are selectively controlled by the tracer spindle 403 on which are formed three (3) integral spherical surfaces 404, 405 and 406 spaced vertically along the tracer spindle with the surface 406 located intermediate the ends of the spindle. The spherical surface 406 is seated and retained on the lower side of the vertical valve spool assembly 402 in such a manner as to be universally movable about a pivot point. The spherical surface 405 on the tracer spindle 403 is located thereon at the point of intersection of the axes of the horizontally disposed valve spools 400 and 401. This spherical surface 405 is free to swing horizontally or move vertically through the slide block 407 of the Scotch yoke 408 in order to allow positive control of either or both of the horizontal valve spools 400 and 401, together with or independent of movement of the vertically disposed valve spindle 402. The control slides 409 of the Scotch yoke 408 are freely linked to the horizontal valve spools 400 and 401 so that any deflection of the tracer spindle 403 thereby causes movements of the valve spools and the proper change of volume and direction of the hydraulic fluid or oil flowing under pressure to the cylinders 100, 200 and 300. The spherical surface 404 which is located at the upper end of the tracer spindle 403 is vertically movable through the hole of the centering ring 410 of the rate cam assembly identified generally by the reference character 411.

The tracer unit TU is mounted in position on the adjustable bracket assembly 60 and 61 of the tracer arm TA with the vertically disposed valve spool and sleeve assembly 402 having its axis always parallel with the axis of the vertically disposed hydraulic actuating cylinder and piston unit 300, and with the axis of the valve spool and sleeve assemblies 400 and 401 parallel with the cylinder and piston units 100 and 200 or with the units 200 and 100, respectively. When the tracer unit TU is in its mounted position with casing extension 82 supported on bracket 61 and, for example, with the tracer arm TA mounted on one of the seats at the right-hand side of the ram R, then the valve spool and sleeve assembly 401 is located in position with its axis parallel with the axis of the cylinder and piston unit 200 and the valve spool and sleeve assembly 400 is located in position with its axis parallel with the axis of the cylinder and piston unit 100. Thus mounted relative to a master positioned for tracing by the tracer spindle T, the resulting directions of feeding movements of the ram R with the cutterhead CH and its cutter spindle C will correspond to and follow the directions of lateral deflection of the tracer spindle T by the the operator in scanning or tracing the master. When the tracer unit TU is in its mounted position with the casing extension 81 supported on bracket 61 and, say, with the tracer arm TA mounted on one of the seats at the left-hand side of the ram R, then the valve spool and sleeve assembly 401 is located in position with its axis parallel with the axis of the cylinder and piston unit 100 while the valve spool and sleeve assembly 400 is then positioned with its axis parallel with the axis of the cylinder and piston unit 200. Thus the directional control of the movements of the cutterhead CH and its cutter spindle C over the work relative to the movements of the tracer spindle T over the master is maintained so that the movements of the cutter spindle relative to the work will always be in the same direction as the directions of the lateral tracing deflections of the cutter spindle T relative to the master.

With the tracer unit in the selected position of mounting on and from the ram R, that is, in position mounted by extension 81 or by extension 82, the unit is operated by applying light finger tip pressures to the tracer spindle T to trace the pattern or master mounted in the usual manner in fixed position below the tracer spindle. As the tracer spindle T is directionally moved vertically or deflected laterally in scanning the master, it will, through the hydraulic system which couples the tracer unit TU with the several hydraulic cylinder and piston units 100, 200 and 300, cause actuation by the latter cylinders of the saddle S, ram support SR and ram R to move the cutterhead CH and cutter spindle C in the precisely identical directions and through precisely the same distances as the directions and distances of the movements of the tracer spindle. As the controlling operation of the tracer unit TU is well understood in the art, a detailed description of the precise selective operation of the valve spool and sleeve assemblies 400, 401 and 402 by the tracer spindle TU is believed unnecessary. It will suffice to note that displacement of the tracer spindle T upwardly or downwardly actuates the valve spool or sleeve assembly 402 to cause operation of hydraulic cylinder 300 and its piston 301 to move the ram R and cutter spindle C of the cutterhead CH correspondingly upwardly or downwardly. Similarly, deflection of the tracer spindle T laterally in either direction along a line parallel with the axis of either the valve spool or sleeve assembly 400 or the valve spool or sleeve assembly 401 will result in the case of valve spool 401 in corresponding movement of the hydraulic cylinder and piston unit 200 to longitudinally feed the saddle S on base B together with the ram support SR, ram R, and cutterhead CH with cutter spindle C as a unit assembly. Deflections of the tracer spindle T along lines at angles to the axes of the valve spools 400 and 401 will cause combined and simultaneous controlling operation of both of such spools to effect combined or compound movements of the saddle S and the ram supprt SR to thereby laterally move the cutter spindle C in the corresponding direction and through the same distance as the direction and distance of deflection of the tracer spindle.

*The self-contained, built-in hydraulic system*

As hereinbefore pointed out, these so-called erector type machines, such as the milling machine of the example of the invention herein disclosed, are, in effect, taken to the work or the work is taken to the machine but in neither case is the work mounted in or on the machine for movements thereby relative to the tool which is to operate or reproduce on the work. Heretofore, with such machines of the power fed forms, where the movable components of the machine are power-fed by a hydraulic system, it has been necessary to provide for each machine a separate and remotely mounted and assembled hydraulic system connected by the necessary pressure fluid lines to the machine, so that where, as with a large work structure, several of these erector type machines were used to work upon or reproduce on the work, it was either necessary to provide a separate and remotely located hydraulic system for each machine or one system with a plurality of separate sets of fluid lines to the several machines.

An important feature of and contribution by the present invention is the provision of a completely self-contained, hydraulically fed and tracer controlled reproducing or duplicating machine of the so-called erector type in which the entire hydraulic system is built into and completely self-contained in the machine as a permanent and cooperative part of the assembly thereof. By this feature the invention provides an extremely compact basic structure with the power fed components of the machine which move the cutter spindle in the three dimensions, confined within a cubical space of minimum dimensions relative to the size and power of each particular machine embodiment of the invention.

This feature of the invention is carried out and expressed in the example machine by essentially utilizing the ram support SR to mount and support within the space provided by it, the major components of the hydraulic system which provides the oil under pressure for selectively operating the actuating cylinders 100, 200 and 300, under the control and dictation of the tracer unit TU in the scanning of a master by the tracer spindle T. The ram support SR which provides the cross movement component of the machine, is designed to enclose by its bottom wall 23, opposite side walls 25, and front wall 26 a mounting space to receive and mount therein the pressure fluid or oil tank 91 of the hydraulic system. This oil tank 91 in this example is of generally rectangular form having a width to snugly fit within and between the opposite side walls 25 with a length of substantially the length of the ram support SR from the inner side of the front wall 26 to the rear end thereof. The tank 91 in this example has a depth or height greater than the maximum depth or height of the side walls 25 and front wall 26 so that it extends a distance above such walls. The tank 91 is provided with the opposite side, forward pair of mounting and positioning lugs 91a and with the opposite side, rear pair of mounting and positioning lugs 91b which fit over and rest upon the adjacent upper edges of the side walls 25, respectively. Fastening members such as the machine screws 91c are provided extending downwardly through the lugs 91a and 91b into suitable tapped bores in the side walls 25 to thereby releasably rigidly attach the tank 91 in mounted position on the ram support SR.

The hydraulic system of the example machine is more or less diagrammatically shown in Fig. 10, and includes the tank 91 which is charged or filled to the required volume with oil to be placed under pressure and form the pressure fluid for operating the cylinder and piston units 100, 200 and 300 of the machine. In this example the pressure fluid system is operated at a fluid pressure of approximately 270 p. s. i. and this pressure is developed by a 2 h. p. electric motor M. In the example machine the electric motor M is mounted at the rear of the right-hand side wall 25 of the ram support SR in position horizontally disposed in the space provided between the upper edge 25a—25b of such right-hand wall 25 and the top of the tank 91. An oil pressure pump P is mounted in the tank 91 in driven connection with the motor M. The pump in this particular example may be considered to have a capacity of 5 gallons per minute and the tank T to have a capacity of 60 gallons of oil. The valve spool and sleeve assemblies 400, 401 and 402 of the tracer unit TU are connected by suitable flexible pressure fluid and exhaust fluid lines with the pump P and the tank 91 and with the hydraulic actuating cylinders 100, 200 and 300 for effecting pressure fluid operation of such cylinders under the selective control and dictation of the tracer spindle T in scanning or tracing a pattern or master. Thus the complete hydraulic system, including tankage, pump and all of the fluid lines, is built into and forms a self-contained assembly of the machine so that the machine may be set up or mounted relative to the work and placed in complete operating condition merely by connecting the motor M with a suitable source of electric power by any usual flexible power cable.

The diagrammatic layout of the hydraulic system as disclosed in Fig. 10, shows the basic system of the example machine and the tracer unit controlled pressure and exhaust flow lines thereof. This diagrammatic showing of the basic system is expressed in specific adaptation and mounting in the example machine of Fig. 1 hereof to meet the structural and assembly requirements of such machine and reference to such adaptation will be made hereinafter.

The casing 80 and its extensions 81 and 82 of the tracer unit TU in which are operatively mounted the valve spool and sleeve assemblies 400, 401 and 402 for controlling the operation of the hydraulic cylinder and piston units 100, 200 and 300, respectively, are provided with suitable ports therein by which the tracer unit is connected into the system between pump P and tank 91 and the actuating cylinders 100, 200 and 300. In this instance the casing 80 is provided with a pressure fluid intake port P1 for supply of oil under pressure from the pump P through the valve spool and sleeve assembly 400 to the cylinder 100 for actuating the latter. A similar pressure fluid port P2 is provided in the casing 80 for supplying oil under pressure from pump P through the valve spool and sleeve assembly 401 to the cylinder 200 for actuating the latter. A port P3 is formed through the side wall of the casing 80 for supplying oil under pressure through the vertically disposed valve spool and sleeve assembly 402 to the vertically disposed hydraulic cylinder and piston unit 300 for actuating the latter unit. Pressure ports P1, P2 and P3 are connected in the usual manner familiar in this art by suitable channels and passages with the valve spool and sleeve assemblies 400, 401 and 402, respectively. An exhaust port X1 is provided in the casing 80 in operative communication by the usual channels and passages with the valve spool and sleeve assembly 400 in casing extension 81 for returning from said valve spool assembly back to the tank 91, the exhaust oil delivered thereto by the hydraulic actuating cylinder 100. An exhaust port X2 is provided in the casing 80 in operative communication by the usual channels and passages with the valve spool and sleeve assembly 401 of casing extension 82 for returning from said valve spool assembly back to the tank 91, the exhaust oil delivered thereto by the hydraulic actuating cylinder 200. An exhaust port X3 is provided in the casing 80 in operative communication by the usual channels and passages with the valve spool and sleeve assembly 402 for returning from said valve spool assembly back to the tank 91, the exhaust oil delivered thereto by the hydraulic actuating cylinder 300.

The casing extension 81 is provided with the ports C3 and C4 which are connected with the hydraulic cylinder 100 at opposite sides of the piston 101 thereof by the fluid lines L3 and L4 formed by suitable flexible hose. The ports C3 and C4 are operatively connected with the valve spool and sleeve assembly 400 in casing extension 81 in such a manner that with the valve spool moved to one set of positions oil under pressure is delivered from port P1 by line L3 to one end of the cylinder 100 and oil is exhausted by line L4 from the opposite end of the cylinder to port X1, while when the valve spool is moved to a reverse set of positions, the port C4 is connected with the pressure port P1 and delivers oil under pressure to the end of the cylinder served by the line L4 while oil is exhausted from the opposite end of the cylinder through the line L3 to the exhaust port X1.

The casing extension 82 is provided with the ports C1 and C2 therein which are connected with the hydraulic cylinder 200 at opposite sides of the piston 201 of that cylinder by the fluid lines L5 and L6 formed by suitable flexible hose. The ports C1 and C2 are operatively connected by the usual passages or channels with the valve spool and sleeve assembly 401 in casing extension 82 in a manner such that with the valve spool moved to one set of positions by the tracer spindle T, oil under pressure is then delivered from port C1 by line L5 to one end of the cylinder 200 and oil is exhausted by line L6 from the opposite end of the cylinder through port C2 and the spool and sleeve assembly to the port X2. When the valve spool 401 is moved to a reverse set of positions, port C2 is connected with the pressure port P2 and delivers oil under pressure to the end of the cylinder 200 served by the line L6, while oil is exhausted from the opposite end of the cylinder through the line L5, port C1, the valve spool and sleeve assembly to the exhaust port X2.

The casing 80 in which is mounted and housed the vertically disposed valve spool and sleeve assembly 402, is provided with the ports C5 and C6 which are connected with the vertically disposed hydraulic cylinder 300 at opposite sides of the piston 301 thereof by the fluid lines L7 and L8 formed by suitable flexible hose. The ports C5 and C6 are operatively connected with the valve spool and sleeve assembly 402 in the casing 80 in a manner such that with the valve spool moved to one set of positions oil under pressure is delivered from the port P3 through the valve spool and sleeve assembly 402 and by line L7 to one end of the cylinder 300 and oil is exhausted by line L8 from the opposite end of the cylinder through port C5, the valve spool and sleeve assembly 402 to the port X3. When the valve spool 402 is moved to a reverse set of positions, port C5 is connected with the pressure port P3 and delivers oil under pressure to the end of the cylinder 300 served by the line L8 while oil is exhausted from the opposite end of the cylinder through the line L7 to the exhaust port X3.

The discharge or pressure side of the pump P is connected to a flexible hose pressure line L10, which in this instance is connected to and supplies oil under pressure to the pressure ports P1, P2 and P3 by the lines L11, L12 and L14, respectively. In this example a needle valve V1 is connected into line L11, a needle valve V2 is connected into line L12, and a needle valve V3 is connected into line L14. An exhaust line L15 extends down into the tank 91 and is connected by the lines L16, L17 and L18 with the exhaust ports X1, X2 and X3, respectively, of the tracer unit TU.

The intake of the pump P is connected with an intake line L19 which extends therefrom down into the body of oil in tank 91, thus completing the hydraulic circuits from the pump P through the valve spool and sleeve assemblies 400, 401 and 402 and the hydraulic actuating cylinders 100, 200 and 300. A pressure relief line L20 also extends into the tank 91 and connects into a pressure relief valve V4 which in this example is rated at 20 p. s. i.

In the hydraulic system of this particular example a vacuum unit VU is included in a line L21 which extends a limited distance into the tank 91 and which extends to and is coupled into the line L10 by a line L22 in which is included a pressure relief valve V5 having a capacity of 300–500 p. s. i. A line L23 is connected into vacuum unit VU and extends into a port VP formed through the side wall of casing 80 of tracer unit TU in the usual manner and for the usual purpose familiar with this known type of system.

The hydraulic system as diagrammatically portrayed in Fig. 10 is expressed by an adaptation thereof as a specific construction and assembly forming the self-contained, built-in system for the actual machine of the present example of the invention disclosed in Fig. 1. In such adaptation to the example machine certain of the hydraulic conduits or lines are formed of lengths or sections of flexible hose so located and connected in the machine assembly as to give to the power driven movable feed components, that is, the saddle S, the ram support SR, and the ram R complete freedom of movement for their intended operations without interference by or interference with such hydraulic lines, as well as to give the tracer unit TU complete freedom of bodily displacement to its various positions of mounting on the tracer arm TA and the tracer arm TA to its various positions of mounting on the ram R without interference from or with the hydraulic lines connected with the tracer unit.

Referring to the example machine as particularly shown in Figs. 1 and 10, the pressure fluid or oil lines L3 and L4 which connect the ports C3 and C4 of the tracer unit TU with the opposite ends of the hydraulic cylinder 100 for longitudinally moving the saddle S, are comprised of lengths or sections of flexible hose which extend from the tracer unit to a connector or manifold member 25 and by lengths or sections of conduit from the manifold member L25 to the opposite ends of the cylinder 100. Similarly, pressure fluid or oil lines L5 and L6 which connect the ports C1 and C2 of the tracer unit TU with the opposite ends of the hydraulic cylinder 200 for effecting cross movements of the ram carrier SR on the saddle S are formed of lengths or sections of flexible hose connected between the tracer unit and the connector or manifold member L25 and sections of conduit or lines which extend between the manifold member L25 and opposite ends of the cylinder 200. The lines L7 and L8 which connect the ports C5 and C6 of the tracer unit TU with the opposite ends of the hydraulic cylinder 300 for vertically moving the ram R to vertically displace the cutter spindle C, are formed by lengths or sections of flexible hose connected between the tracer unit and the manifold member L25 and sections of flexible hose from the latter member to the upper end of the ram R and through the cover 36 thereof by suitable conduits or lines to the opposite ends of the hydraulic cylinder 300 mounted in the ram. The pressure fluid or oil line L11 which delivers oil under pressure from the pump P to the port P1 of the tracer unit T for pressure fluid supply for the hydraulic cylinder 100 includes a length or section of flexible hose from a connection at the right-hand side wall of tank 91 to the tracer unit TU. The pressure fluid or oil line L14 which supplies oil under pressure from the pump P to the port P3 for supplying oil under pressure to the cylinder 300 includes a length or section of flexible hose extending from a connection at the right-hand side wall of tank 91 to the tracer unit TU, and a similar length or section of flexible hose is included in the pressure line L12 which connects with the port P2 of the tracer unit for supplying oil under pressure from the pump P to the cylinder 200. The exhaust line L15 which receives exhaust oil from the exhaust ports X1, X2 and X3 in the tracer unit TU includes a length or section of flexible hose which extends to the right-hand side wall of the tank 91 for returning exhaust oil from the hydraulic cylinders 100, 200 and 300. In the example machine the vacuum line L23 includes a length or section of flexible hose which also connects into the right-hand side wall of the tank 91 and extends therefrom to the port VP in the side wall of the casing 80 of the tracer unit TU. These various lengths or sections of flexible hose making up the oil flow lines of the system of the machine are of such lengths as to have sufficient slack to permit of powered movements of the saddle S, the ram support SR and the ram R, as well as movements of the tracer unit TU to its various mounted positions on ram R, without interference between such components, and the flexible hose sections.

In the example machine a lubricating system is provided for lubricating the various parts of the machine, including particularly the slideway and slide 20 and 21 for the saddle S on the base B; the slideway 22 and slide 24 for the saddle S and ram support SR; and the slideways 27 and slides 34 for the ram R on the front wheel 26 of the ram support SR. Such lubricating system is fully self-contained and built into the example machine as a permanent part of the assembly thereof and includes an air cylinder AC mounted in horizontally disposed position along the left-hand side of the ram support SR above the cylinder 200. The air cylinder AC is actuated by a solenoid valve SV. A reservoir and pump unit RP is mounted on the left-hand side of ram support SR spaced forwardly of but in general alignment with the air cylinder AC. The reservoir and pump unit RP is operatively coupled with the solenoid valve controlled air cylinder AC. Suitable lubricant conducting pipes or tubes connect the reservoir and pump unit RP with the various surfaces of the machine to be lubricated by and from such lubricating system, as exemplified by the lubricant lines OL shown in Fig. 2 leading from the unit RP to the saddle S.

In the operation and use of a reproducing or duplicating machine of the invention, such as the example machine hereof, the machine is either taken to the work or the work is brought to the machine and the latter is then mounted and supported by the base B in any suitable or desired manner with the ram R and the cutterhead CH with its spindle C in position for reproducing or duplicating the master on the work by means of the tool or milling cutter 11. When so set up at or adjacent the work, the machine is, of course, completely self-contained, including the hydraulic operating system thereof, and requires only connection with a suitable source of electric power for its operation.

Depending upon the location of the work piece relative to the ram R and cutter spindle CH and upon the location of the area of the work piece on which the reproduction or duplication is to be performed, the cutterhead CH is first mounted on that one of its mounting seats on the ram R which will place the cutter spindle C and its milling cutter 11 in operative relation with the work piece. For example, as illustrated in the accompanying drawings, the cutterhead CH may be mounted on the seat FL of ram R with the cutter spindle C projecting downwardly therefrom for operating upon the area of a work piece located below the cutter spindle C, and with the tracer arm TA mounted on its seat TF on the front side of ram R projecting outwardly and downwardly therefrom to locate the tracer unit TU at a suitable or convenient location for positioning the master to be traced. In such mounted position of the tracer arm TA on the upper front side of the ram R the tracer unit TU is mounted by its casing extension 82 on the adjustable bracket assembly 60—61 which assembly is itself adjustably mounted on the end 55 of the tracer arm TA. Thus mounted, the tracer spindle T of the tracer unit TU depends downwardly from the latter and the master to be duplicated on the work by the machine is suitably mounted in generally horizontally disposed position therebelow for scanning or tracing engagement by the lower end of the tracer spindle T, as will be readily understood in this art. If, however, the area of the work piece to be worked upon is located above the ram R, then the cutterhead CH would be remounted in reverse position on the seat FU on the upper portion of the ram R in position with the cutter spindle C projecting upwardly from the cutterhead. Again, depending upon the particular conditions prevailing, with the tracer unit TU in its position located above the ram R, the tracer arm TA, with the tracer unit TU, can remain in the position of the illustrated example or can be mounted on any one of its other seats on the ram R, as may be found necessary or desirable. If a reproducing operation requires mounting of the tracer unit TU on the left-hand side of the ram R with the tracer arm TA in either downwardly or upwardly projected position, then the tracer unit TU is mounted by its casing extension 81 on the bracket 61 to align the valve spool and sleeve assemblies 400, 401 and 402 in axial parallelism with the hydraulic feed actuating cylinders 100, 200 and 300 in the manner hereinbefore specifically described and explained. With the illustrated and the other set-ups of the cutterhead CH and tracer unit TU hereinabove referred to as examples, it will be fully apparent and understood that a plurality of other and different set-ups and selected mountings of the cutterhead CH and the tracer unit TU on the ram R may be readily made so that the machine has an extremely wide range of operation to meet various conditions presented by different sizes, shapes and constructions of work pieces.

The final precise adjustments of the tracer unit TU and its tracer spindle T in any set-up thereof on the ram R are made by the adjustable mounting of the bracket 60 and 61 and the adjustable mounting of the tracer unit TU on the bracket 62. Adjustments of the tracer unit TU horizontally and radially relative to the vertical axis of the ram R are made by the micrometer thumb wheel 66 to bodily adjust the assembly of bracket 60, bracket 61, and the tracer unit TU on the tracer arm TA. Adjustments of the tracer unit TU horizontally in either direction along a straight-line path at right angles to the path of adjustment of bracket 60 on tracer arm TA are made by the micrometer thumb wheel 75, while adjustments vertically of the tracer head TU on and relative to bracket 61 and the tracer arm TA are made by means of the micrometer thumb wheel 89. Thus by such adjustments a fine and precise setting of the tracer spindle T relative to a master or pattern and relative to the work can be made quickly and accurately.

While a machine of the invention has a wide range and flexibility of working operations to meet a variety of reproducing or duplicating conditions, nevertheless in all of the multiple positions of mounting for both the cutterhead CH and the tracer unit TU, the self-contained and built-in hydraulic system with all of its flexible fluid lines arranged and connected in permanent operative positions as hereinbefore described and explained, provides a machine which is always in fully operative condition for supplying the hydraulic power required in the feeding operations of the longitudinal feed and cross feed components through which the movements of the tracer spindle T over a master are precisely reproduced on a work piece by the cutter spindle C. Hence, as the machine is a fully self-contained and self-supporting operative assembly, it can be readily moved and set up at any location without dependence or reliance upon outside source of supply with the connections necessary therefor, supply other than an electric power connection for the machine.

Due to the construction and combination of components in a machine of the invention extreme compactness is obtained both horizontally and vertically so that a minimum of space is required for the machine. As an example, the machine of the invention specifically disclosed herein has a longitudinal feed of 12", a cross feed of 12", and a vertical feed of 8", so that the basic components of the machine assembly without the tracer attached will fit within and occupy a 3-foot cubical space.

The example machine is constructed and arranged for three-dimensional duplication of a three-dimensional master on a work piece in 1:1 ratio. However, it is to be understood that the invention is not limited to machines for three-dimensional reproduction but may be expressed and used with equal advantage in machines for two-dimensional reproduction, and while the example machine is constructed for duplication in 1:1 ratio, the invention is not intended to be so limited but includes a reproduction on the work piece from a master at increased or decreased reproduction ratios.

It will also be evident that various other changes, modifications, eliminations, substitutions and additions may be resorted to without departing from the broad spirit and scope of my invention, and hence I do not desire or intend to limit my invention in all respects to the exact and specific constructions, combinations, and subcombinations of the selected example of the disclosures hereof, except as may be required by specific and intended limitations thereto appearing in any of the appended claims.

What I claim is:

1. In a duplicating machine, in combination, a base having a straight-line slideway extending completely thereacross through and unobstructed at the opposite ends of said base; a saddle member slidably mounted on said slideway on said base constrained to straight-line movements thereby in either direction longitudinally across said base and beyond either end thereof; said saddle member having on the side thereof opposite said base a straight-line slideway thereacross normal to the straight-line path of longitudinal movements of said saddle member on said base; a ram support structure slidably mounted on said slideway on said saddle member constrained thereby to straight-line movements in either direction across said saddle member; a ram member slidably mounted on one end of said ram support structure constrained to straight-line movements thereon along a path normal to the straight-line paths of movement of said saddle member and said ram support structure; a cutterhead, including a cutter spindle mounted in normally fixed position on and movable as a unit assembly with said ram member; a tracer arm mounted on said ram member in a normally fixed position relative to the position of mounting of said cutterhead on said ram member; said tracer arm extending laterally outwardly from said ram member and being bodily movable with said ram member and said cutterhead thereon as a unit assembly; a tracer unit mounted on said tracer arm; said tracer unit being of the hydraulic type including hydraulic control valves therein and a tracer spindle connected therewith for selectively operating said control valves; a first hydraulic means operatively connected between said base and said saddle member for moving the latter; a second hydraulic means operatively connected between said saddle member and said ram support structure for cross-moving the latter on said saddle member; a third hydraulic means operatively connecting said ram member with said ram support structure for moving said ram member with said cutterhead, said tracer arm and said tracer unit together as a unit assembly on and independently of said ram support structure; a self-contained, powered hydraulic unit including a fluid supply tank and a fluid pressure pump and driving motor therefor mounted on and movable as a unit assembly with said ram support structure for supplying fluid under pressure from said fluid supply tank to said first hydraulic means, said second hydraulic means and said third hydraulic means; flexible pressure fluid lines connected between said pump and said fluid supply tank and said control valves of said tracer unit; flexible fluid lines connected between said control valves of said tracer unit and said first hydraulic means, said second hydraulic means and said third hydraulic means, respectively, for controlling operations of said saddle member, said ram support structure and said ram member by selective operation of said control valves of said tracer unit by said tracer spindle; and said flexible pressure fluid lines between said pump and said fluid supply tank and said control valves of said tracer unit and between said control valves and said first hydraulic means, said second hydraulic means and said third hydraulic means being in normal permanent connection therewith and of lengths providing slack therein for movements freely of said saddle member, said ram support structure, and said ram member throughout the maximum ranges of movements thereof, respectively.

2. In a duplicating machine, in combination, a base having a straight-line slideway extending completely thereacross through and unobstructed at the opposite ends of said base; a saddle member slidably mounted on said slideway on said base constrained to straight-line movements thereby in either direction longitudinally across said base and beyond either end thereof; said saddle member having on the side thereof opposite said base a straight-line slideway thereacross normal to the straight-line path of longitudinal movements of said saddle member on said base; a ram support structure slidably mounted on said slideway on said saddle member constrained thereby to straight-line movements in either direction across said saddle member; a ram member slidably mounted on one end of said ram support structure constrained to straight-line movements thereon in either direction along a path normal to the straight-line paths of movement of said saddle member and said ram support structure; a motorized cutter spindle unit detachably mounted in normally fixed position on said ram member and being movable as a unit assembly therewith; a tracer unit of the hydraulic type mounted on and carried by said ram member for movement therewith as a unit assembly; a first hydraulic means operatively connected between said base and said saddle member for moving the latter; a second hydraulic means operatively connected between said saddle member and said ram support structure for cross moving the latter on said saddle member; a third hydraulic means operatively connecting said ram member with said ram support structure for moving said ram member with said motorized cutter spindle unit and said tracer unit together as a unit assembly on and independently of said ram support structure; a self-contained and self-sufficient, powered hydraulic unit mounted on and movable as a unit assembly with said ram support structure for supplying fluid under pressure; flexible fluid supply lines connected between said powered hydraulic unit and said tracer unit; a set of flexible fluid supply lines connected between said tracer unit and said first hydraulic means, a set of flexible fluid supply lines connected between said tracer unit and said second hydraulic means, and a set of flexible fluid supply lines connected between said tracer unit and said third hydraulic means, respectively, for controlling operations of said saddle member, said ram support structure and said ram member by operation of said tracer unit; and said flexible fluid supply lines of each of said sets thereof being all in normal, permanent mounting and connection and of lengths providing slack therein for movements freely of said saddle member, said ram support structure, and said ram member throughout the maximum ranges of movements thereof, respectively.

3. A duplicating machine including, in combination, a ram support structure mounted for universal lateral movements; a ram member mounted on one end of said ram support structure constrained to movements thereon independently thereof in either direction along a straight-line path substantially normal to the plane of said universal lateral movements of said ram support structure; a self-contained motorized cutter spindle unit detachably mounted in normally fixed position on an outer side of said ram member; said motorized cutter spindle unit being movable as a unit assembly with said ram member; a tracer arm detachably mounted on said ram member in normally fixed position relative to the position of said motorized cutter spindle on said ram member and being movable with said ram member and said motorized cutter spindle unit as a unit assembly; a tracer unit mounted on and carried by said tracer arm; said tracer unit being of the hydraulic type including hydraulic control valves therein and a tracer spindle connected therewith for selectively operating said control valves; hydraulically actuated means for universally laterally moving said ram support structure; hydraulic means connected with said ram member for moving the latter with said motorized cutter spindle unit, said tracer arm and said tracer unit together as a unit assembly on and independently of said ram support structure; a self-contained and self-sufficient, powered hydraulic unit including a pressure fluid supply tank, a pressure pump and driving motor therefor mounted on and movable as a unit assembly with said ram support structure for supplying fluid under pressure from said fluid supply tank; flexible fluid lines connected between said pump and said fluid supply tank and said control valves of said tracer unit; flexible fluid lines connected between said control valves of said tracer unit and said hydraulically actuated means for universally laterally moving said ram support structure; flexible fluid lines also connected between said control valves of said tracer unit and said hydraulic means for independently moving said ram member on said ram support structure; and said flexible fluid lines between said pump and said fluid supply tank and said control valves of said tracer unit and between said control valves of said tracer unit and said hydraulically actuated means for universally laterally moving said ram support structure and between said control valves and said hydraulic means for independently moving said ram member being in normal permanent mounting and connection and having lengths providing slack therein for movements freely of said ram support structure and said ram member throughout the maximum ranges of movements thereof, respectively.

4. A duplicating machine including, in combination, a ram support structure mounted for universal lateral movements; a ram member movably mounted on said ram support structure constrained to movements thereon independently thereof in either direction along a straight-line path substantially normal to the plane of said universal lateral movements of said ram support structure; a motorized cutter spindle unit detachably mounted in normally fixed position on and movable as a unit assembly with said ram member; a tracer unit of the hydraulic type mounted on and carried by said ram member; hydraulically actuated means for universally laterally moving said ram support structure; hydraulic means connected with said ram member for selectively moving the latter with said motorized cutter spindle and said tracer unit as a unit assembly on and independently of said ram support structure; a self-contained, powered hydraulic unit including a pressure fluid supply tank, a pressure pump and driving motor therefor mounted on and movable as a unit assembly with said ram support structure for supplying fluid under pressure from said supply tank; flexible fluid lines connected between said pump and said fluid supply tank and said hydraulic tracer unit; flexible fluid lines connected between said hydraulic tracer unit and said hydraulically actuated means for universally laterally moving said ram support structure; flexible fluid lines also connected between said hydraulic tracer unit and said hydraulic means for independently moving said ram member on said ram support structure; and said flexible fluid supply lines between said pump, said fluid supply tank and said hydraulic tracer unit and between said hydraulic tracer unit and said hydraulically actuated means for universally laterally moving said ram support structure and between said hydraulic tracer unit and said hydraulic means for independently moving said ram member all being in normal permanent mounting and connection and having lengths providing slack therein for movements freely of said ram support structure and said ram member throughout the maximum ranges of movements thereof, respectively.

5. A duplicating machine, including, in combination, a ram support structure mounted for universal lateral movements; a ram member movably mounted on said ram support structure constrained to movements thereon independently thereof in either direction along a straight-line path substantially normal to the plane of said universal lateral movements of said ram support structure; a self-contained motorized cutter spindle unit detachably mounted in normally fixed position on and movable as a unit assembly with said ram member; a tracer unit of the hydraulic type mounted on and movable as a unit assembly with said ram member; hydraulically actuated means for universally laterally moving said ram support structure; hydraulic means connected with said ram member for moving the latter with said motorized cutter spindle unit and said tracer unit as a unit assembly; a self-contained and self-sufficient powered hydraulic unit mounted on and movable as a unit assembly with said ram support structure for supplying fluid under pressure; flexible fluid lines connected between said powered hydraulic unit and said tracer unit; flexible fluid lines connected between said tracer unit and said hydraulically actuated means for universally laterally moving said ram support structure; flexible fluid lines connected between said tracer unit and said hydraulic means for independently moving said ram member on said ram support structure; and all of said flexible fluid lines having lengths providing slack therein for movements freely of said ram support structure and of said ram member, respectively, throughout the maximum ranges of movements thereof.

6. A duplicating machine including, in combination, a ram support structure mounted for universal lateral movements; a ram member mounted on one end of said ram support structure constrained to movements thereon independently thereof in either direction along a straight-line path substantially normal to the plane of said universal lateral movements of said ram support structure; a self-contained motorized cutter spindle unit mounted in normally fixed position on an outer side of said ram member; a tracer unit of the hydraulic type mounted on and supported from an outer side of said ram member in a normally fixed position relative to the position of said motorized cutter spindle unit on said ram member; hydraulically actuated means for universally laterally moving said ram support structure; hydraulic means connected with said ram member for moving the latter with said motorized cutter spindle unit and said tracer unit together as a unit assembly on and independently of said ram support structure; a self-contained and self-sufficient, powered hydraulic unit mounted on and movable as a unit assembly with said ram support structure for supplying fluid under pressure; and normally permanently mounted and connected fluid lines between said powered hydraulic pressure fluid supplying unit and said tracer unit and between said tracer unit and said hydraulically actuated means for universally laterally moving said ram support structure and said hydraulic means for moving said ram member.

7. In the combination as defined in claim 1, said ram support structure having side walls therearound extending outwardly therefrom at the side thereof opposite said saddle member; and said fluid supply tank of said powered hydraulic unit being mounted on and built into said ram support structure in position within and contained by said side walls of said ram support structure.

8. In the combination defined by claim 2, said ram support structure having side walls thereon extending from the side thereof opposite said saddle member; and said self-contained and self-sufficient, powered hydraulic unit being mounted on said ram support structure in position received within and contained by said side walls thereof.

9. In the combination of claim 2, said third hydraulic means comprising a hydraulic actuating cylinder mounted and confined within and carried by said ram member and a piston unit slidably mounted therein connected with said ram support structure in fixed position thereon.

10. In a duplicating machine, in combination, a ram support structure mounted for universal lateral movements; a ram member movably mounted on one end of said ram support structure constrained to movements thereon independently thereof in either direction along a straight-line path substantially normal to the plane of said universal lateral movements of said ram support structure; said ram member having side walls therearound provided with mounting seats on the outer sides thereof spaced apart longitudinally of said outer sides; a self-contained, motorized cutter spindle unit detachably mounted in normally fixed position on a selected mounting seat of said ram member and movable as a unit assembly with said ram member; a tracer unit of the hydraulic type mounted on and supported from a side wall of said ram member; said tracer unit being of the hydraulic type and movable together with said motorized cutter spindle unit and said ram member as a unit assembly; hydraulically actuated means for universally laterally moving said ram support structure; hydraulic means for moving said ram member with said motorized cutter spindle unit and said tracer unit as a unit assembly on and independently of said ram support structure; a self-contained and self-sufficient powered hydraulic unit built into and movable as a unit assembly with said ram support structure for supplying fluid under pressure; flexible pressure fluid lines connected between said powered hydraulic unit and said tracer unit; flexible fluid lines connected between said tracer unit and said hydraulically actuated means for universally laterally moving said ram support structure; flexible fluid lines connected between said tracer unit and said hydraulic means for moving said ram member on and independently of said ram support structure; and all of said flexible fluid lines having lengths providing slack therein for movements freely of said ram support structure and of said ram member, respectively, throughout the maximum ranges of movements thereof.

11. In the combination as defined in claim 5, said ram member having side walls therearound provided with cutter spindle unit mounting seats on the outer sides and spaced apart longitudinally thereof for mounting said motorized cutter spindle unit in operative position on any selected one of said mounting seats.

12. In the combination as defined in claim 5, said ram member having side walls therearound provided with cutter spindle unit mounting seats on the outer sides and spaced apart longitudinally thereof for mounting said cutter spindle unit in operative position on any selected one of said mounting seats; a tracer arm mounted on a side wall of said ram member in position extending laterally outwardly therefrom; said tracer unit being mounted on and carried by said tracer arm; and said side walls of said ram member being also provided with a plurality of tracer arm mounting seats thereon spaced apart therearound for mounting said tracer arm on any selected one of said tracer arm mounting seats to locate said tracer unit in an operative position relative to the mounted position of said motorized cutter spindle unit on said ram member.

References Cited in the file of this patent

UNITED STATES PATENTS

| 2,674,160 | Martellotti | Apr. 6, 1954 |
| 2,823,590 | Swanson et al. | Feb. 18, 1958 |